(12) United States Patent
Kato

(10) Patent No.: US 7,095,436 B2
(45) Date of Patent: Aug. 22, 2006

(54) DIGITAL CAMERA CAPABLE OF OUTPUTTING IMAGE DATA TO EXTERNAL APPARATUS

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 671 days.

(21) Appl. No.: 10/014,090

(22) Filed: Nov. 13, 2001

(65) Prior Publication Data

US 2002/0060740 A1 May 23, 2002

(30) Foreign Application Priority Data

Nov. 17, 2000 (JP) ............................. 2000-350407

(51) Int. Cl.
   *H04N 5/225* (2006.01)
   *H04N 5/76* (2006.01)
(52) U.S. Cl. ................................. 348/231.2; 348/207.1
(58) Field of Classification Search ........... 348/231.99, 348/231.6, 231.2, 231.3, 207.1, 207.2
   See application file for complete search history.

(56) References Cited

U.S. PATENT DOCUMENTS

| | | | | |
|---|---|---|---|---|
| 6,198,526 | B1 * | 3/2001 | Ohtsuka ...................... | 355/40 |
| 6,424,385 | B1 * | 7/2002 | Koyama et al. ............. | 348/734 |
| 6,567,122 | B1 * | 5/2003 | Anderson et al. ........... | 348/211.3 |
| 6,573,927 | B1 * | 6/2003 | Parulski et al. .............. | 348/32 |
| 2002/0036698 | A1 * | 3/2002 | Mizutani ..................... | 348/232 |

FOREIGN PATENT DOCUMENTS

| JP | 7-200632 | 8/1995 |
|---|---|---|
| JP | 8-44758 | 2/1996 |
| JP | 10-145715 | 5/1998 |

OTHER PUBLICATIONS

Yagawa et al. "The Digital Album: A Personal File-tainment System." IEEE Proceedings of Multimedia '96. pp. 434-439.*

* cited by examiner

*Primary Examiner*—Tuan Ho
*Assistant Examiner*—Timothy J. Henn
(74) *Attorney, Agent, or Firm*—Frishauf, Holtz, Goodman & Chick, P.C.

(57) ABSTRACT

A digital camera is provided with a plurality of group specifying keys for specifying a use purpose of a photographed picture. In such an external flash memory of the digital camera that stores the photographed pictures is generated a plurality of index files that corresponds to the group specifying keys. When any one of the plurality of group specifying keys is pressed when some of the recorded pictures are displayed, file names of those pictures being displayed are sequentially described in an index file corresponding to that pressed group specifying key. When using the picture file, the personal computer reads out a plurality of picture files described in an index file which corresponds to a desired use purpose to then conduct the corresponding processes at a time based on that index file.

62 Claims, 13 Drawing Sheets

FIG.4
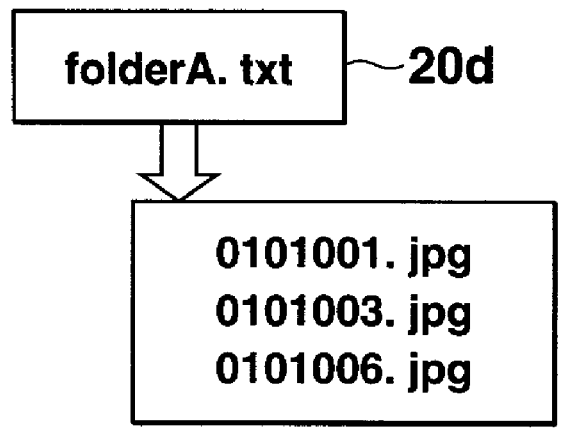
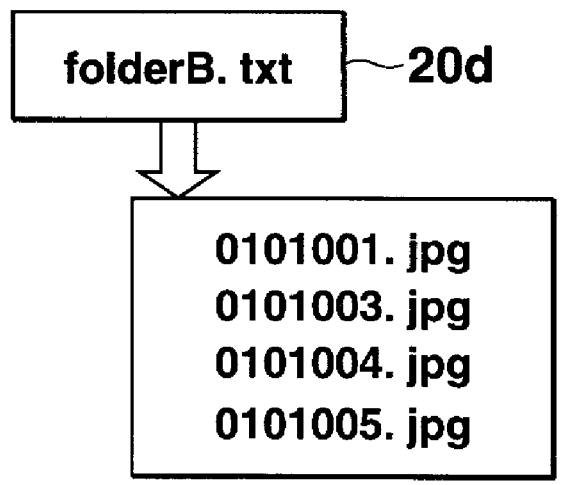
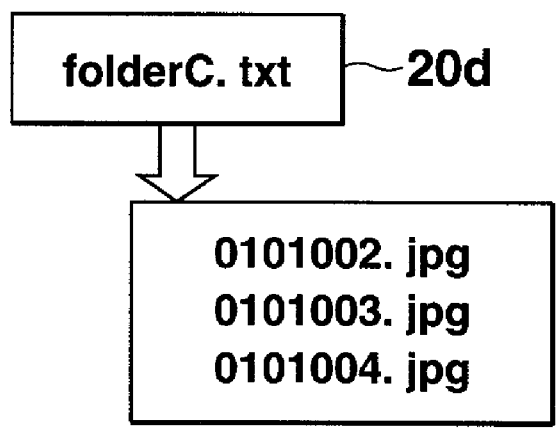

DIGITAL CAMERA CAPABLE OF OUTPUTTING IMAGE DATA TO EXTERNAL APPARATUS

CROSS-REFERENCE TO RELATED APPLICATIONS

This application is based upon and claims the benefit of priority from the prior Japanese Patent Application No. 2000-350407, filed Nov. 17, 2000, the entire contents of which are incorporated herein by reference.

BACKGROUND OF THE INVENTION

1. Field of the Invention

The present invention relates to a digital camera capable of outputting picture (image) data to an external apparatus, a picture data managing device, a picture data managing method, and a recording medium in which a picture data managing program is recorded.

2. Description of the Related Art

Recently, digital cameras have been equipped with a display such as an LCD, which functions as a view finder, and which allows a photographed picture to be reproduced and confirmed on the display without using any other devices. In such a digital camera, a picture of a subject imaged by a solid imaging device such as a CCD is recorded as picture data in a recording medium such as a flash memory. Pieces of the picture data are compressed in a predetermined format such as JPEG (Joint Photographic Expert Group) and are then recorded in an order they were photographed in the recording medium as picture files having file names each consisting of, for example, a date and time.

Furthermore, some digital cameras typically utilize cable communication, for example via a USB (Universal Serial Bus) connection, or wireless communication, for example via infrared light, to thereby transmit picture data to an external apparatus such as another digital cameras or a personal computer. Digital cameras may also have a detachable memory such as the above-mentioned recording medium, which may be attached to the external apparatus so that the external apparatus can access the picture data. Therefore, with such a digital camera, the picture data recorded by photographing can be accessed on a personal computer and copied on a floppy disk, for example, so that the pictures may be distributed to a plurality of persons. That is, it is possible to make extra copies of photographed images, as is possible with silver-salt cameras.

However, in an attempt to copy specific picture data to a floppy disk with a personal computer, it is difficult to identify the picture to be copied using only the above-mentioned file name. Accordingly, it is necessary to display and confirm on a monitor the pictures in the order (or reverse order) they were photographed and then to select a specific one of them and copy it on a floppy disk. It is thus troublesome and inefficient to distribute many pictures to many persons. In particular, when a personal computer with a low picture processing capability is used, it takes a long time to confirm the pictures to be copied, thus causing the process of copying and distributing the pictures to be remarkably inefficient.

BRIEF SUMMARY OF THE INVENTION

It is an object of the present invention to provide a digital camera, a picture data managing apparatus, a picture data managing method, and a recording medium recording therein a picture data managing program that can output picture data recorded in the digital camera to an external apparatus and improve a working efficiency in picture processing executed by the external apparatus on the picture data.

To achieve the above object, according to a first preferred aspect of the present invention a digital camera is provided which includes: an imaging section for imaging a subject and outputting a plurality of pieces of image data; a specifying section for specifying at least one of the plurality of image data pieces output from the imaging section; an index file generating section for generating an index file containing an identifier with which any image data piece specified by the specifying section can be identified; and a control section for storing in an image storage section a plurality of image data pieces output from the imaging section, and for storing in an index file storage section an index file generated by the index file generating section, wherein the configuration enables improving a working efficiency in image processing on the image data by an external apparatus.

According to a second preferred aspect of the present invention a digital camera is provided which includes: imaging means for imaging a subject and outputting a plurality of pieces of image data; specifying means for specifying at least one of a plurality of image data pieces output from the imaging means; index file generating means for generating an index file containing an identifier with which any image data piece specified by the specifying means can be identified; and control means for storing in an image storage section the plurality of image data pieces output from the imaging means and also storing in an index file storage section an index file generated by the index file generating means, wherein the configuration enables improving a working efficiency in image processing on the image data by an external apparatus.

According to a third preferred aspect of the present invention an image data managing apparatus is provided which includes: an image storage section for storing a plurality of image data pieces; a specifying section for specifying at least one of the plurality of image data pieces stored in the image storage section; an index file generating section for generating an index file containing an identifier with which any image data piece specified by the specifying section can be identified; and an index file storage section for storing an index file generated by the index file generating section, wherein the configuration enables improving a working efficiency in image processing on the image data by an external apparatus.

According to a fourth preferred aspect of the present invention a computer-readable recording medium is provided that has recorded thereon an image data managing program for causing a computer of a digital camera provided with an imaging section for imaging a subject and outputting picture data thereof to execute the processes of: specifying at least one of a plurality of pieces of image data output from the imaging section; generating an index file containing an identifier with which any specified image data piece can be identified; and storing a generated index file in a memory, whereby a working efficiency in image processing on the image data by an external apparatus can be improved.

According to a fifth preferred aspect of the present invention an image data managing method for a digital camera is provided which includes: imaging a subject and outputting image data; specifying at least one of a plurality of thus output image data pieces; generating an index file containing an identifier with which any specified image data piece can be identified; and storing a generated index file in a memory, whereby a working efficiency in image processing on the image data by an external apparatus can be improved.

According to a sixth preferred aspect of the present invention an image data managing apparatus is provided which includes; an acquiring section for acquiring an index file which is stored in an index file storage section and which contains an identifier with which any image data piece can be identified; and a control section for executing image processing on any one of the image data pieces stored in an image storage section that is identified by the identifier contained in an index file acquired by the acquiring section, wherein the configuration enables improving a working efficiency in image processing on the image data by an external apparatus.

According to a seventh preferred aspect of the present invention an image data managing apparatus is provided which includes: acquiring means for acquiring an index file which is stored in an index file storage section and which contains an identifier with which any image data piece can be identified; and control means for executing predetermined image processing on any one of the image data pieces stored in an image storage section that is identified by an identifier contained in an index file acquired by the acquiring means, wherein the configuration enables improving a working efficiency in image processing on the image data by an external apparatus.

According to an eighth preferred aspect of the present invention a computer-readable recording medium is provided that has recorded thereon an image data managing program for executing the processes of: acquiring an index file which is stored in an index file storage section and which contains an identifier with which any image data piece can be identified into a computer of an image data managing apparatus for processing image data; and executing predetermined image processing on any one of image data pieces stored in an image storage section that is identified by an identifier contained in an acquired index file, whereby a working efficiency in image processing on the image data by an external apparatus can be improved.

According to a ninth preferred aspect of the present invention a picture data managing method is provided which includes: acquiring an index file which is stored in an index file storage section and which contains an identifier with which any image data piece can be identified; and executing predetermined image processing on any one of the image data pieces stored in an image storage section that is identified by an identifier contained in an acquired index file, whereby a working efficiency in image processing on the image data by an external apparatus can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is an illustration for explaining data contents of an index file recorded in the external flash memory;

DETAILED DESCRIPTION OF THE INVENTION

The following will describe embodiments of the present invention with reference to the drawings.

First Embodiment

Figure 1:
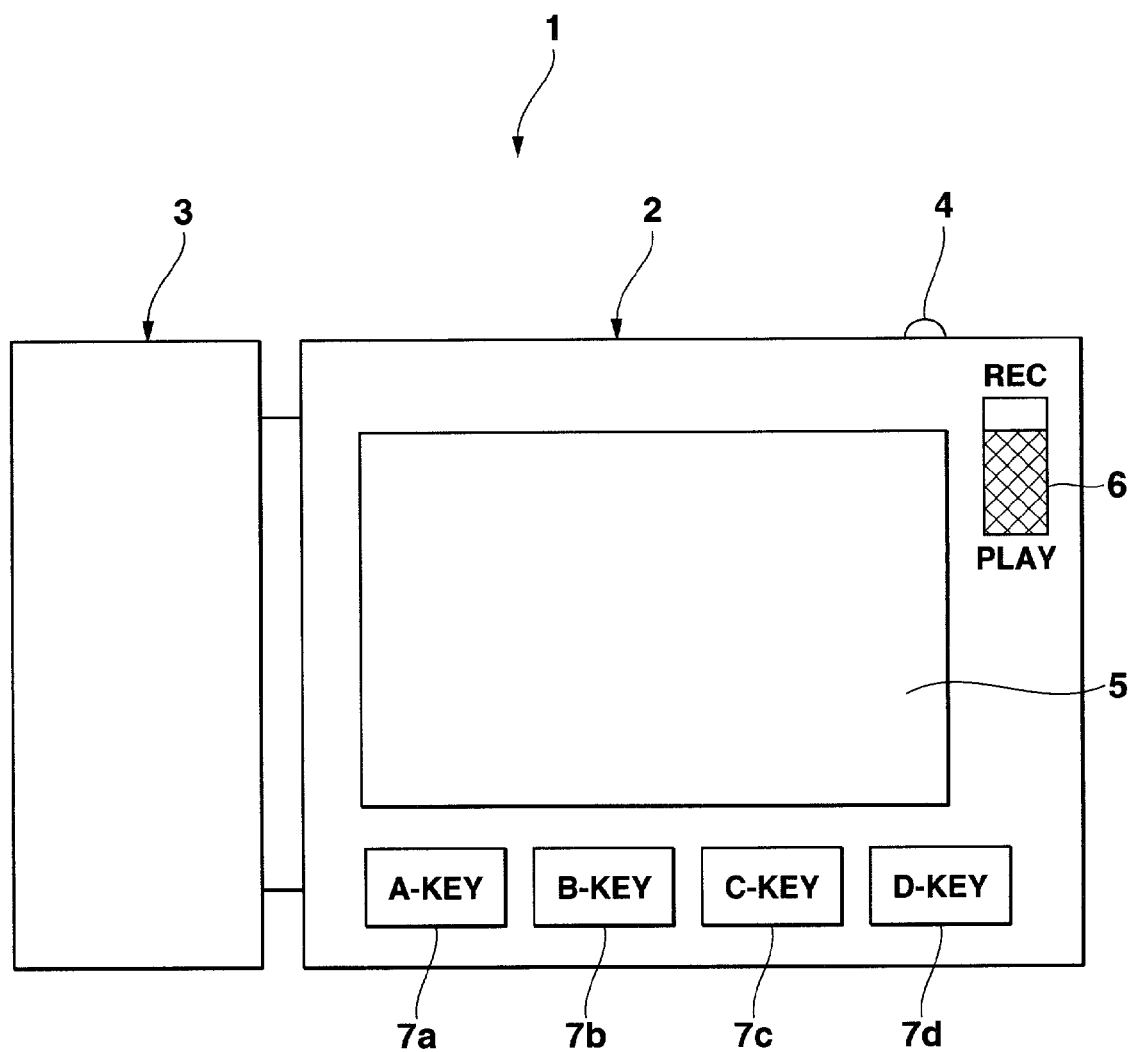
FIG. 1 is an external view for showing a digital camera related to a first embodiment of the present invention.

FIG. 1 is an external view for showing a digital camera 1 related to the first embodiment of the present invention. A digital camera 1 includes a camera section 3 coupled to a side of an apparatus body 2 in such a manner that the camera section 3 may rotate in a vertical direction. The camera section 3 is equipped with an optical system including an imaging lens, a diaphragm, etc., which are not shown. A shutter key 4 is provide on the right side of the apparatus body 2. On the rear face of the apparatus body 2, a display 5, i.e. a TFT-type LCD monitor, is provided. On a side of the display 5, a mode switching key 6 is provided for switching the operation mode of the digital camera 1 between an imaging mode (REC) for imaging and recording an image of a subject and a reproduction mode (PLAY) for displaying a recorded picture. Below the display 5, first through fourth operation keys 7a–7d (shown as "A-KEY", "B-KEY", "C-KEY", and "D-KEY") are arranged in this order from the left. The first through fourth operations keys of 7a–7d are assigned different functions in the different imaging and reproduction modes; in the reproduction mode, for example, they are used as a group specification key, thus functioning as a specifying section (specifying means) of the present invention.

Figure 2:
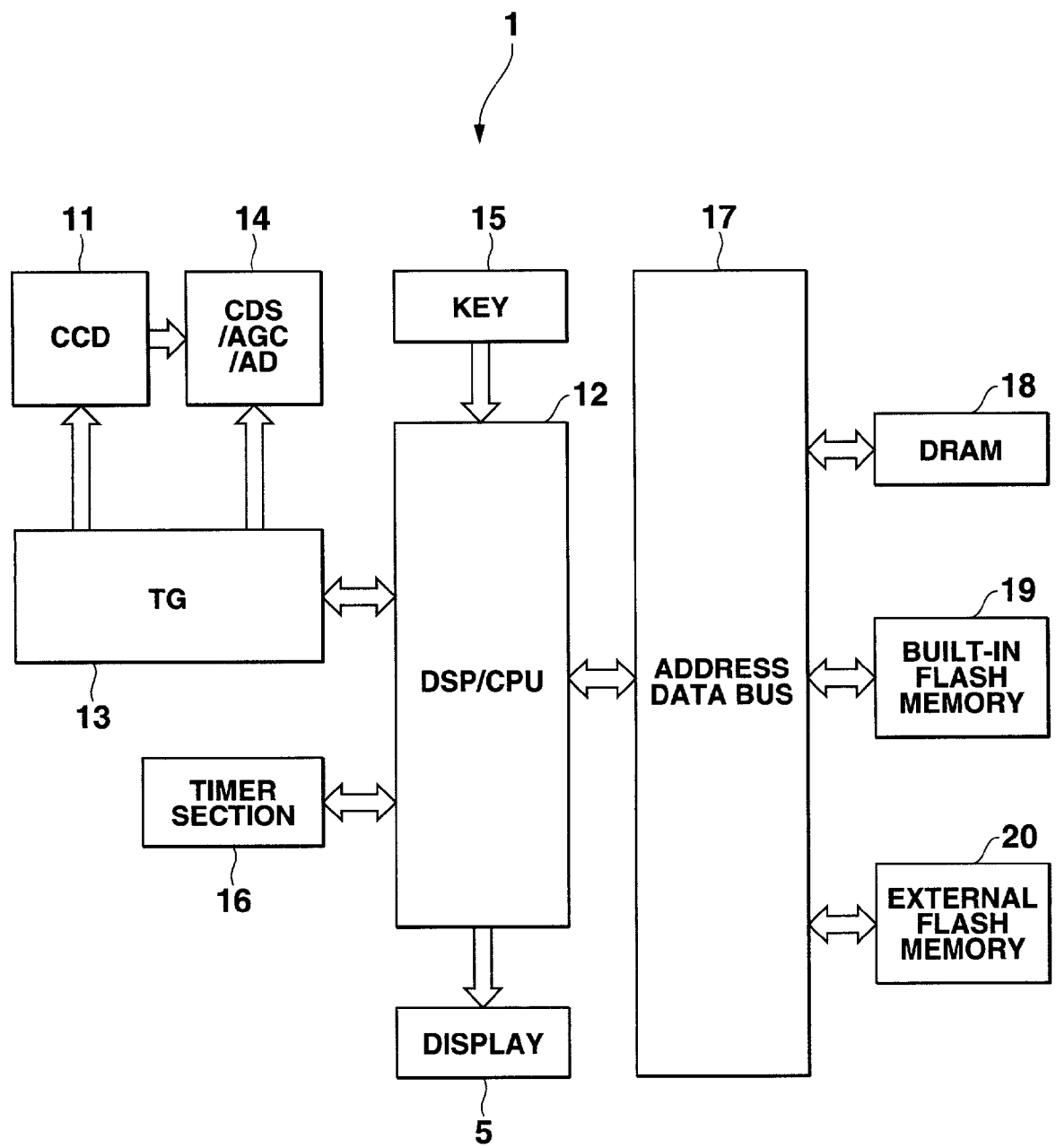
FIG. 2 is a block diagram for showing an outline of the digital camera of the first embodiment.

FIG. 2 is a block diagram for showing an outlined electrical configuration of the digital camera 1. The digital camera 1 is housed in the camera section 3 and includes a CCD 11, on whose light-reception face is formed an optical image, and a DSP/CPU 12. The DSP/CPU 12 is a one-chip micro-controller having a function of sampling, amplifying, and digitizing an analog signal and a function of controlling various sections of the digital camera 1.

To the DSP/CPU 12 is connected a TG (Timing Generator) 13 for driving the CCD 11. A unit circuit 14, to which an imaging analog signal corresponding to a brightness of a subject output from the CCD 11 is input, is connected to TG 13. The unit circuit 14 is comprised of a CDS for holding an imaging analog signal output from the CCD 11, a gain-control amplifier (AGC) which is an analog amplifier for amplifying this imaging signal, and an A/D converter (AD) for converting an imaging signal amplified at the gain adjustment amplifier into an imaging digital signal, in such a configuration that an output signal of the CCD 11 is sent as a digital signal to the DSP/CPU 12 via the unit circuit 14.

The above-mentioned display 5, a key-input section 15 for generating a key-input signal corresponding to any of the above-mentioned shutter key, the plurality of operation keys 7a–7d, and a power supply key, and a timer section 16 having a calendar function and a function to output the current date data, day-of-the-week data, and time data to the DSP/CPU 12 are connected to the DSP/CPU 12. And a DRAM 18, an internal flash memory 19, and an external flash memory 20 are connected to the DSP/CPU 12 via an address/data bus 17. The DRAM 18 temporarily stores a digitized imaging signal of a subject imaged by the CCD 11 when the system is set in the photographing wait mode. The built-in flash memory 19 serves as a recording medium of the present invention for storing a variety of kinds of data used for control of an operating program of the DSP/CPU 12 and the various sections, and the built-in flash memory 19 also has a reserved work area that is used by the DSP/CPU 12. The DSP/CPU 12 operates according to the above-mentioned operating program to function as a control section (control means), a specifying section (specifying means), and an index file generating section (index file generating means) of the present invention.

The external flash memory 20 functions as a picture storage section and an index file storage section of the present invention and serves as a card-type recording medium which can be attached to and detached from the apparatus body 2, so that when photographing is instructed by pressing the shutter key 4 in the photographing wait mode, one frame of picture data read out by the DSP/CPU 12 from the DRAM 18 undergoes various picture processes and is compressed and finally recorded as a picture file in this external flash memory 20.

Figure 3:
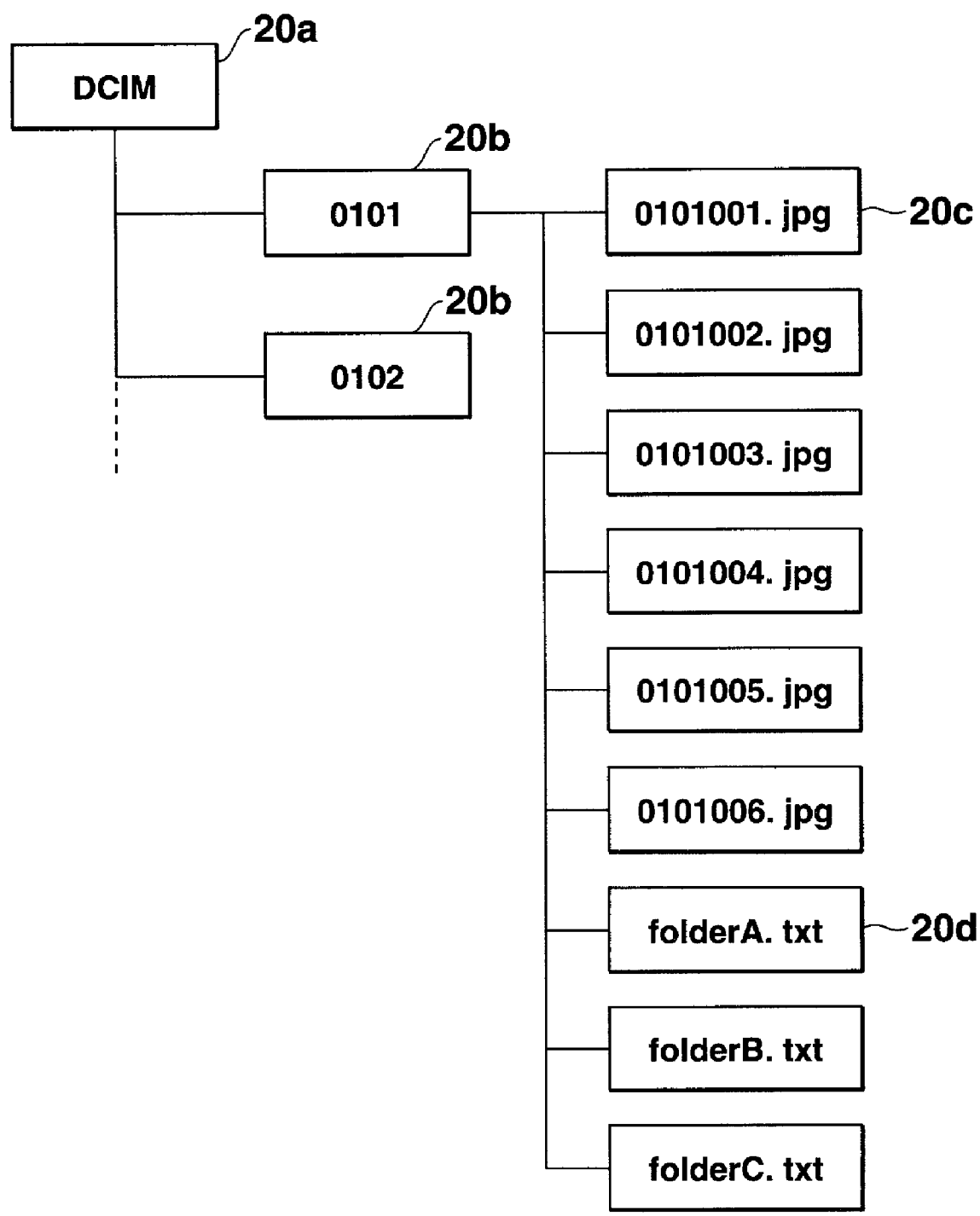
FIG. 3 is an illustration for showing a file storage construction in an external flash memory of the first embodiment.

FIG. 3 shows a storage construction of a picture file in the external flash memory 20. In this embodiment, when photographing is instructed, a JPEG-format picture file is generated, so that as shown in FIG. 3, in the external flash memory 20, following a DCIM folder 20a provided beforehand in the initial state thereof are dated folders 20b ("0101", "0102", . . . ) having a photographing date. These dated folder 20b are followed by sequentially recorded picture files 20c of pictures photographed on the same day that have file names ("0101001.jpg", "0101002.jpg", . . . ) each consisting of a date and a serial number.

Each dated folder 20b is followed by the picture file 20c as well as recorded index files 20d ("folderA.text", "folderB.text", "folderC.text") created for each of a plurality of groups predefined by the user. As shown in FIG. 4, the index files 20d are a text-format file consisting only of character data with a described file name of one or a plurality of picture files 20c in each dated folder 20b, and the index files 20d correspond to the first through fourth operation keys 7a to 7d, respectively.

In the imaging wait state where the shutter key 4 is not pressed in the above-mentioned imaging mode, the display 5 functions as a view finder by displaying as a through picture a subject image taken in from the CCD11 and, in the above-mentioned reproduction mode, the display 5 displays a list of pictures as downsized that were recorded in the external flash memory 20 or displays a user-selected picture in a size set at the time of photographing.

Figure 5:
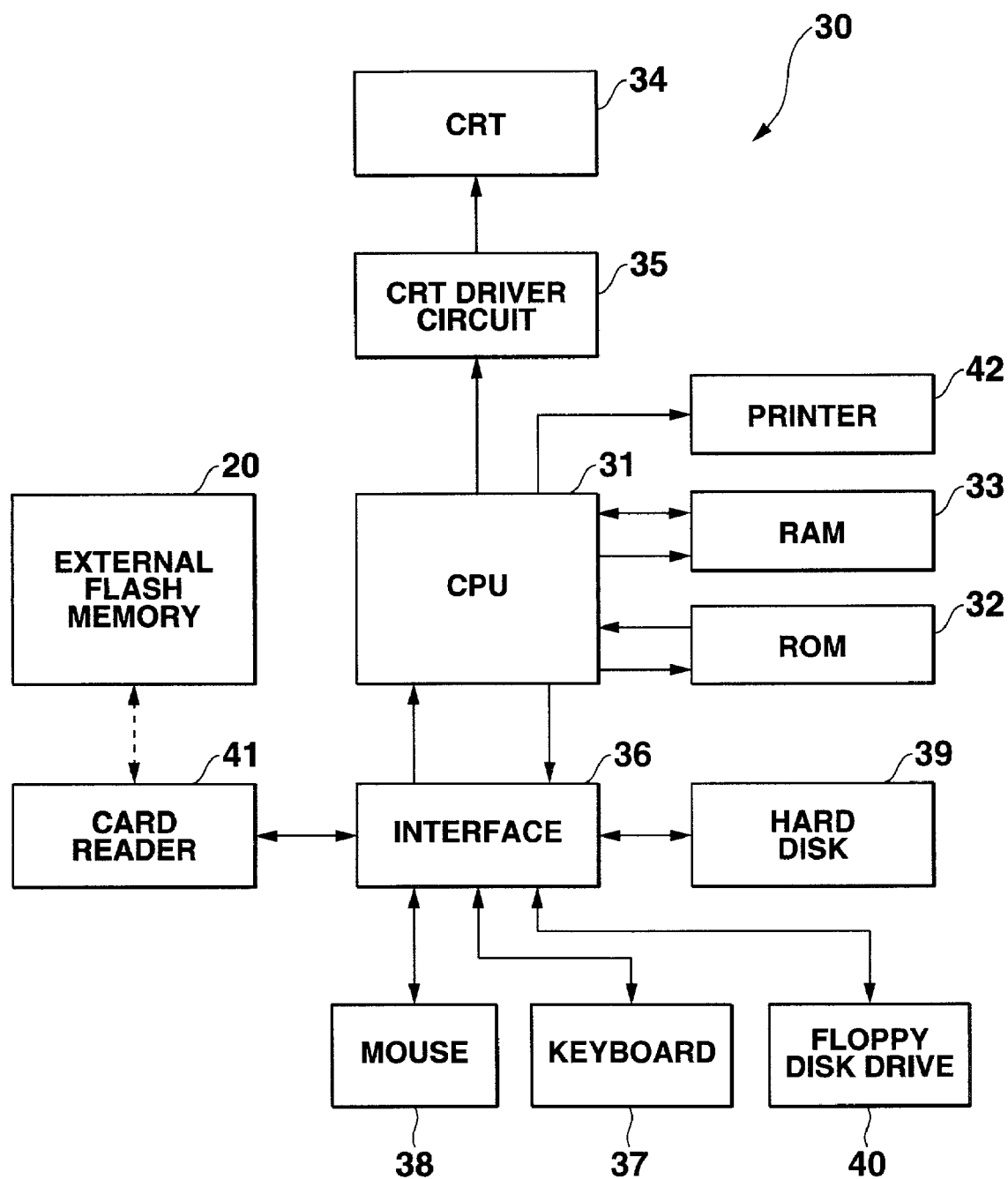
FIG. 5 is a block diagram for showing an outline of a personal computer related to the first embodiment.

FIG. 5 is a block diagram for showing a personal computer as the external apparatus used together with the digital camera 1 in this embodiment. The personal computer 30 has a CPU 31, a RON 32 and a RAM 33 which are connected to the CPU 31, a CRT driving circuit 35 for driving a CRT 34, and a printer 42. A keyboard 37, a mouse 38, a hard disk drive 39, a floppy disk drive 40, and a card reader 41, which has a slot through which an external flash memory 20 used in the digital camera 1 is removably insertable, are connected to the CPU 31 through an interface 36. A program for enabling the card reader 41 to be used, a predetermined copying program for copying, into a drive specified by a user, a predetermined picture file recorded in the external flash memory 20 mounted to the card reader 41, and a predetermined application program for reading picture data from and writing data to the external flash memory 20 are all installed in the hard disk drive 39.

(Grouping of Pictures in Digital Camera)

Figure 6:
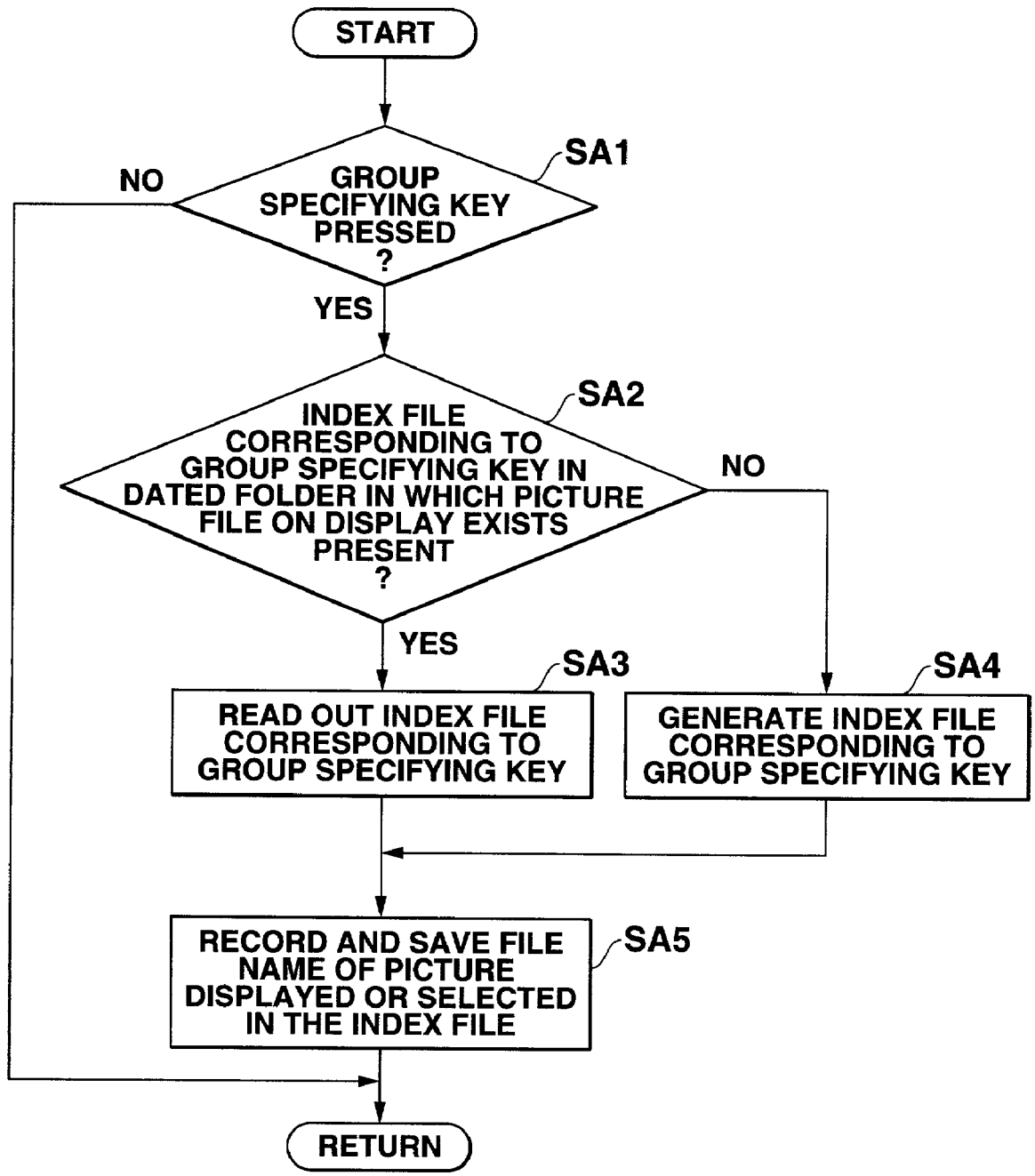
FIG. 6 is a flowchart for showing an operation of grouping pictures photographed by the digital camera of the first embodiment.

The following will describe an operation of grouping pictures in the above-mentioned digital camera 1 in the reproduction mode with reference to the flowchart of FIG. 6. This flowchart shows the behavior of subroutines called by a main routine (not shown) and sequentially executed.

When the reproduction mode is set and any one of the pictures stored in the external flash memory 20 is shown on the display 5 (or a plurality of downsized pictures are shown on the display 5), if any one of the above-mentioned group specifying keys (first through fourth operation keys) 7a to 7d is pressed (YES is answered at step SA1), the digital camera 1 decides whether an index file 20d which corresponds to the pressed group specifying key is present following a dated folder 20b in which a picture file 20c of the picture displayed (or selected) is present (step SA2). When such a corresponding index file 20d is present (YES is answered at step SA2), for example, "folderA.text" is read out as that corresponding index file 20d if that pressed group specifying key is the first operation key 7a (step SA3). If no corresponding index file 20d is present (NO is answered at step SA2), an index file 20d corresponding to the pressed group specifying key, for example, "folderD.text" is newly created if that pressed group specifying key is the fourth operation key 7d (step SA4).

Subsequently, the process enters a file name (e.g., "0101005.jpg") of the currently displayed or selected picture in the index file 20d read out at step SA3 or created at step SA4 then updates (saves) this index file 20d (step SA5) and then returns to the main routine in the reproduction mode. By repeating these operations, the pictures recorded in the external flash memory 20 are sorted into a plurality of groups (four groups in this embodiment), which are indicated by index files 20*d*. Note here that the user can specify the same picture over a plurality of groups, in which case, the same file name is entered in a plurality of different index files 20*d*.

(Copying Pictures in Personal Computer)

Figure 7:
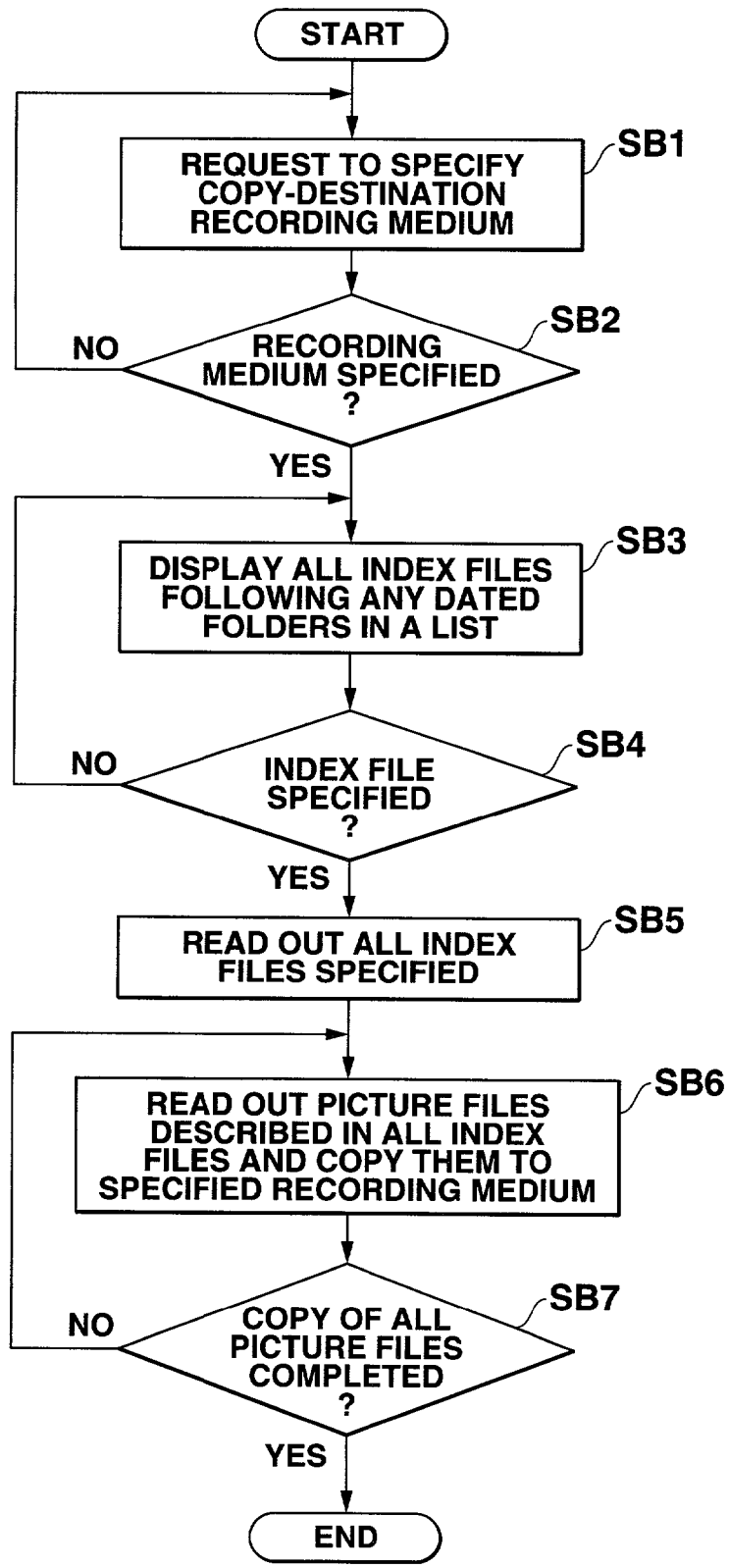
FIG. 7 is a flowchart for showing an operation of picture processing by the personal computer of the first embodiment.

The following will describe the operations when the user has activated the above-mentioned copying program in a state where the external flash memory 20 after undergoing the above-mentioned processing by the digital camera 1 is mounted to the card reader 41, with reference to the flowchart of FIG. 7.

When the copying program is activated, the personal computer 30 displays on the CRT 34 a screen requesting the location (other than the card reader 41) to which a picture file is to be copied, e.g. the floppy disk drive 40 etc. (step SB1), and then awaits specification of the recording medium (step SB2). If the user then specifies a recording medium (drive) (YES is answered at step SB2), the index files 20*d* present following all the dated folders 20*b* in the external flash memory 20 are retrieved and listed on the CRT 34 (step SB3) and then specification of at least one of the index files 20*d* is awaited (step SB4).

If, subsequently, one or more of the index files 20*d* (e.g., "folderA.text") is specified from among this list displayed on the CRT 34 (YES is answered at step SB4), all the specified index files 20*d* are read out (step SB5). Then, all the picture files described in the one or more index files 20*d* having the same file name are sequentially read out from the external flash memory 20 and the read out picture files 20*c* are copied to a recording medium (drive) specified by the user at step SB1 (step SB6). When the relevant picture files 20*c* are all copied completely (YES is answered at step SB7), the process ends immediately.

In this embodiment, therefore, the user can perform the following steps to distribute one or a plurality of pictures photographed by the digital camera 1 using a floppy disk. First, for example, he predefines the first operation key 7*a* ("A-KEY") of the digital camera 1 as a group specifying key for specifying a picture to be copied so that the digital camera 1 may sequentially display or select pictures to be distributed and, when the first operation key 7*a* is presseda picture is selected to be copied. Next, the external flash memory 20 is detached from the digital camera 1 and attached to the personal computer 30 to supply the index file 20*d* ("folderA.text") which corresponds to the first operation key 7*a* ("A-KEY") to the personal computer 30 so that the one or more pictures specified therein may be copied to a floppy disk. Thus, one or a plurality of pictures to be automatically copied to the floppy disk at a time.

That is, the user can operate the personal computer to copy any pictures recorded in the external flash memory 20 directly to the floppy disk without a need of displaying and confirming them one by one. This feature enables rapid copying even with a personal computer having a low picture processing capability. Moreover, even many pictures to be distributed can be copied to the floppy disk at a time. The picture files, therefore, can be copied easily and efficiently.

Furthermore, since the index files 20*d* generated by the digital camera 1 and recorded in the external flash memory 20 are of a text format, even if many picture files are specified (grouped) as pictures to be copied, the size of the index files 20*d* does not significantly increase. Therefore, only a small memory capacity is required to record the index files 20*d*, thus effectively utilizing the storage capacity of the external flash memory.

Also in this embodiment, since the first through fourth operations keys 7*a*–7*d* function as the group specifying keys in the reproduction mode, and since a plurality of index files 20*d* are generated corresponding to the operations of the first through fourth operation keys 7*a*–7*d*, the pictures recorded in the external flash memory 20 can be classified and specified beforehand into a plurality of groups, for example, into a plurality of subject types such as a landscape and a portrait or into subject person groups, so that one or a plurality of the pictures can be rapidly copied at a time for each of thus classified groups. This facilitates use.

It should be noted that, in contrast to this embodiment, any one of the first through fourth operation keys 7*a*–7*d* may be specified to function as the group specifying key so that its operations may instruct the system to create only one index file 20*d*. Even in such a case, the same effect as this embodiment can be obtained. That is, the picture files can be copied easily and efficiently. Also in this case, since no index files 20*d* need to be specified in the personal computer 30, steps SB3 and SB4 of FIG. 7 can be omitted, so that copying starts immediately when the one index file 20*d* is retrieved from the external flash memory 20.

Furthermore, although according to the first embodiment the above-mentioned index files 20*d* are each generated following each of the dated folders 20*b*, the present invention is not limited thereto. For example, an index file 20*d* may be generated, for example, immediately following the DCIM folder 20*a* so that specified picture files 20*c* may be indicated over a plurality of the dated folders 20*b*. A number of the index files 20*d* may correspond to a number the group specifying keys (first through fourth operations keys) 7*a*–7*d*. Thus, rather than generating a plurality of index files 20*d* of the same group for each date, only one index file 20*d* must be generated for the group.

In addition, although according to the first embodiment the index file 20*d* may be generated in the external flash memory 20 based on the operations of the group specifying keys, the present invention is not limited thereto. For example, an index file 20*d* that corresponds to each of the group specifying keys (first through fourth operation keys) 7*a*–7*d* and that has no picture file name recorded may be generated beforehand, for example immediately when the external flash memory 20 is started in use.

Furthermore, although according to the first embodiment the apparatus body 2 of the digital camera 1 is provided with the first through fourth operation keys 7*a*–7*d* so that the user can selectively press each of these operation keys 7*a*–7*d* to thereby specify (select) a picture on the display 5 and also specify its group, the present invention is not limited thereto. For example, an operation key for specifying a desired picture and an operation key for further specifying it's the group of the desired picture may be provided separately from each other; or the same operation key may be used to specify a desired picture and also to specify its group.

Furthermore, although according to the first embodiment the digital camera 1 shas the display for displaying a through picture and a recorded picture, the present invention is not limited thereto. For example, a digital camera may be employed that does not have the display 5. In such a case, for example, when the shutter key 4 is pressed in photographing and if any one of the operation keys 7*a*–7*d* or a predetermined operation key is pressed, a picture file name of a previously photographed picture may be entered in an index file 20*d* which corresponds to an operated group specifying key. Alternatively, if any one of the operation keys 7*a*–7*d* or a predetermined key is pressed immediately before the shutter key is pressed in photographing, a picture file name of a picture photographed immediately afterward may be entered in an index file 20*d* which corresponds to an operated group specifying key.

Furthermore, although according to the first embodiment the external flash memory 20 is detached from the digital camera 1 and is subsequently attached to the card reader 41 of the personal computer 30 so that the personal computer 30 may acquire a picture file 20*c* and an index file 20*d*, the present invention is not limited thereto. For example, the picture file 20*c* and the index file 20*d* may be transferred from the digital camera 1 (later-described digital camera 51 of FIG. 11) to the personal computer 30 via cable communication, for example via a USB cable, or via wireless communication, for example via an infrared light, to be recorded on the hard disk 39 (or the RAM 33, the floppy disk, or the external flash memory 20) of the personal computer 30.

Furthermore, although according to the first embodiment the picture processing conducted on a picture file contained in a specified index file 20*d* is copying the picture file to other recording mediums, the present invention is not limited thereto. For example, the picture processing conducted on the picture file may be any other processing, for example, printing or display processing. In a case of printing processing conducted as the picture processing, only such a program needs to be prepared that when the user has specified any one of the index files 20*d* recorded in the external flash memory 20, one or a plurality of picture files 20*c* described in this specified index file 20*d* may be sequentially read out to the above-mentioned personal computer 30 to cause the printer 42 connected thereto to start printing.

Furthermore, although according to the first embodiment a fixed type of picture processing is conducted on a picture file described in a specified index file 20*d*, the present invention is not limited thereto. For example, any given picture processing selected by the user may be conducted.

The following will describe a specific example where the user selects any given picture processing, with reference to the drawings.

Figure 8:
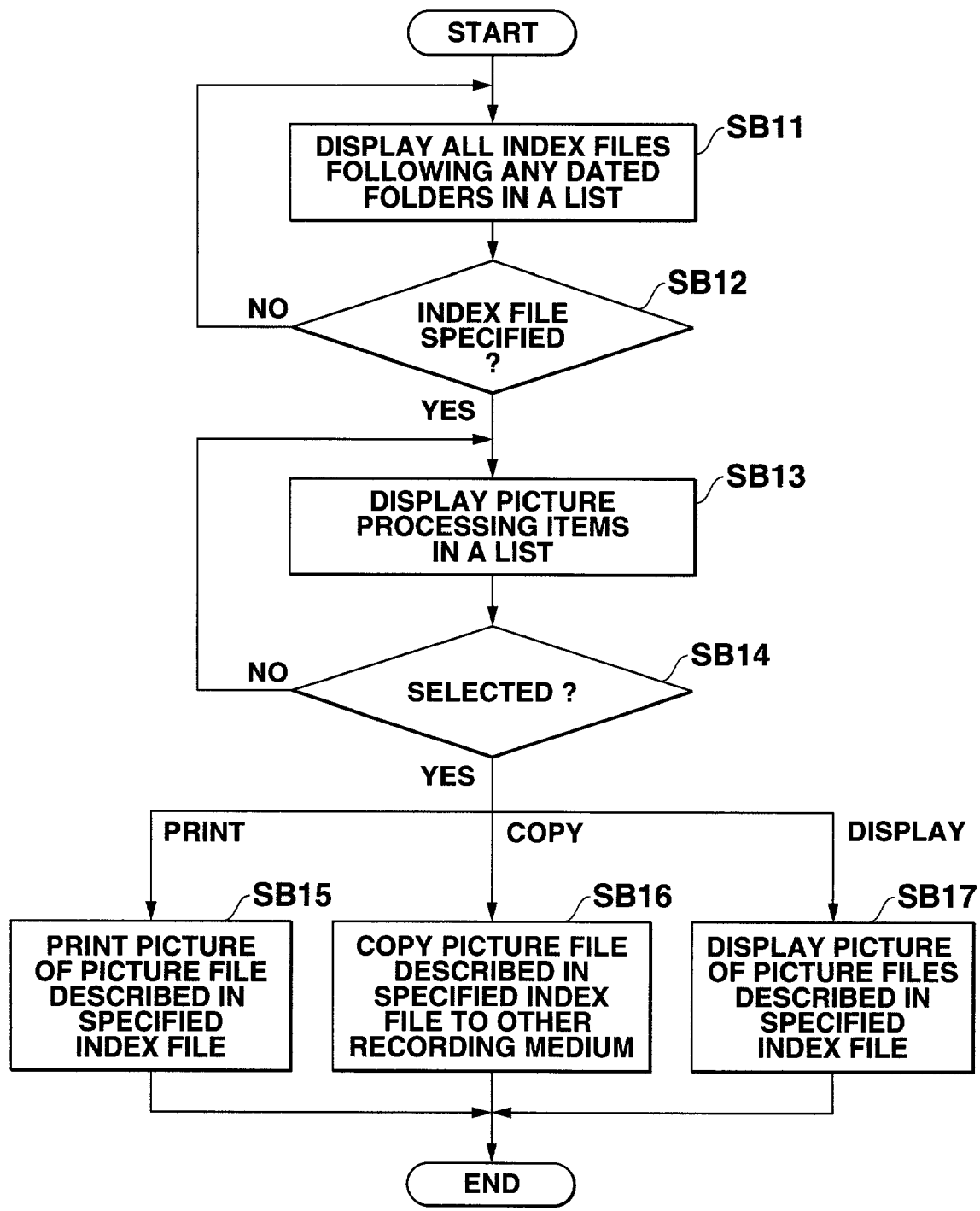
FIG. 8 is a flowchart for showing another operation of picture processing by the personal computer of the first embodiment.

FIG. 8 is a flowchart for explaining a variant of the flowchart of FIG. 7.

Upon activation of the picture processing program, the personal computer 30 searches the external flash memory 20 for all the index files 20*d* following any dated folders 20*b* and lists them on the CRT 34 (step SB11), awaiting the specification of one or more of the index files 20*d* (step SB12).

Subsequently, when one or more of the index files 20*d* in the list displayed on the CRT 34 is specified (YES is answered at step SB12), the types of processing, such as copy, print, display, and other picture processing, are listed on the CRT34 (step SB13) and selection of a picture processing type is awaited (step S314).

If the print processing is selected from the list (YES is answered at step SB14), a picture file (picture files) is read out from the external flash memory 20 that is identified by a picture file name contained in the index file 20*d* specified at step SB12, and the read out picture file is printed by the printer 42, thereby ending the process (step SB15).

If the copy processing is selected from the list (YES is answered at step SB14), on the other hand, a picture file (picture files) is read out from the external flash memory 20 that is identified by a picture file name contained in the index file 20*d* specified at step SB12, and the read out picture file is copied to another recording medium, thereby ending the process (step SB16).

If the display processing is selected from the list (YES is answered at step SB14), on the other hand, a picture file (picture files) is read out from the external flash memory 20 that is identified by a picture file name contained in the index file 20*d* specified at step SB12, and the read out picture file is displayed on the CRT 34, thereby ending the process (step SB17).

Furthermore, although as shown in the flowchart of FIG. 8 the type of picture processing to be conducted on a picture file described in a specified index file 20*d* is selected by hand, the present invention is not limited thereto. For example, the type of picture processing to be conducted may be automatically determined on the basis of a file type of the index file 20*d*.

The following will describe a specific example where the picture processing type is determined automatically, with reference to the drawings.

Figure 9:
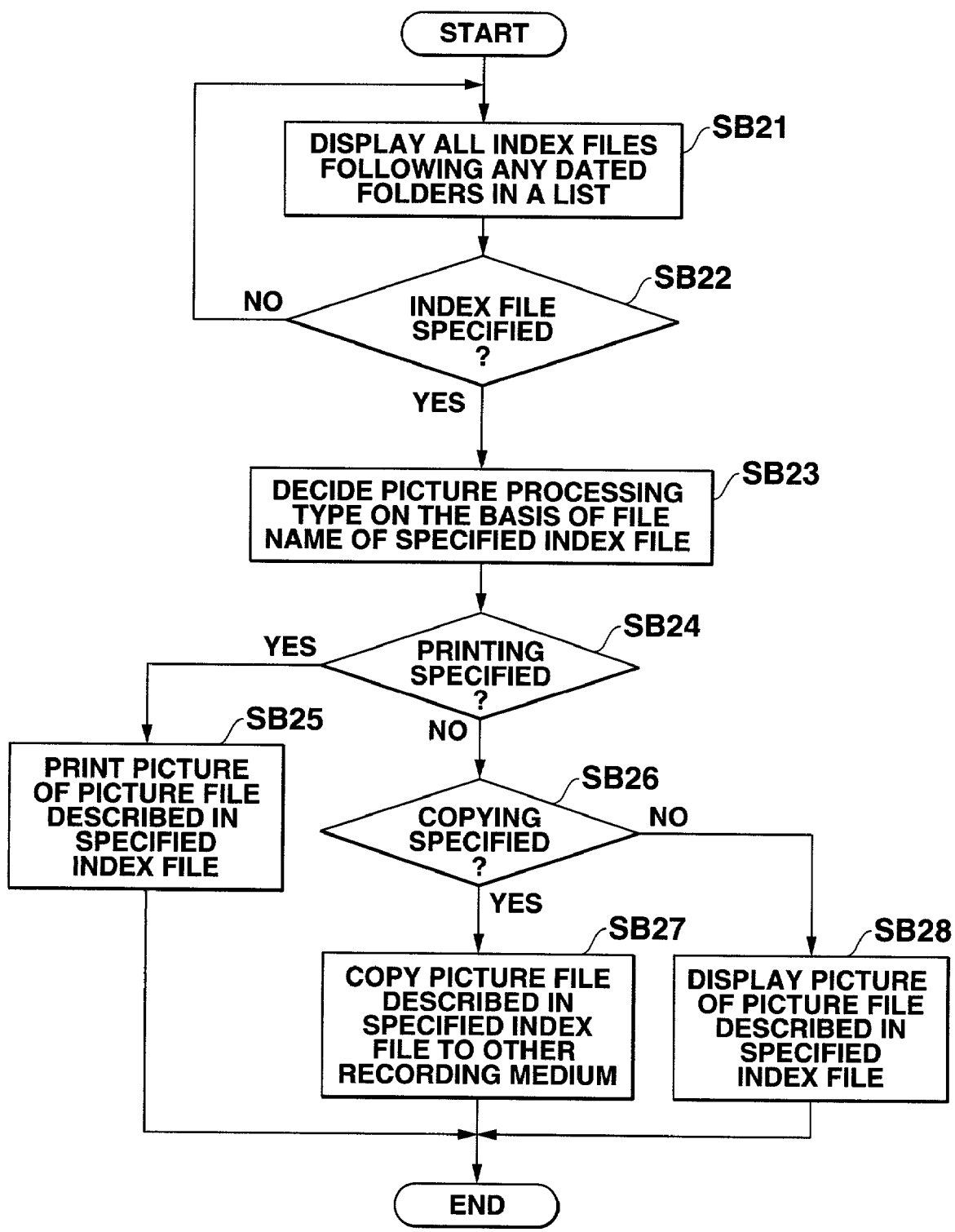
FIG. 9 is a flowchart for showing a further operation of picture processing by the personal computer of the first embodiment.

FIG. 9 is a flowchart for explaining a variant of the flowchart of FIG. 8.

Upon activation of the picture processing program, the personal computer 30 searches the external flash memory 20 for all the index files 20*d* following any dated folders 20*b* and lists them on the CRT 34 (step SB21) and then waits for specification of one or more of the index files 20*d*.

When, subsequently, one or more of the index files 20*d* is specified from the list (YES is answered at step SB22), the picture processing type is determined on the basis of a file name of the specified index file 20*d*. (step SB23).

If the print processing is selected (YES is answered at step SB24), a picture file (picture files) is read out from the external flash memory 20 that is identified by a picture file name contained in the index file 20*d* specified at step SB22, and the read out picture file is printed by the printer 42, thereby ending the process (step SB25).

If the copy processing is selected at step SB23 (YES is answered at step 26), on the other hand, a picture file (picture files) is read out from the external flash memory 20 that is identified by a file name contained in the index file 20*d* specified at step SB22, and the read out picture file is copied to another recording medium, thereby ending the process (step SB27).

If the display processing is selected at step SB23 (NO is answered at step S826), on the other hand, a picture file (picture files) is read out from the external flash memory 20 that is identified by a picture file name contained in the index file 20*d* specified at step SB22, and the read out picture file is displayed on the CRT 34, thereby ending the process (step SB28).

Although the flowchart of FIG. 7 has been described with a case where the index file 20*d* is specified by the user manually, the present invention is not limited thereto. For example, the index file 20*d* may be specified (selected) automatically.

For example, a printer-dedicated terminal (terminal comprised only of the CPU 31, ROM 32, RAM 33, card reader 41, and printer 42 shown in FIG. 5) that is capable of accepting the external flash memory 20 may be used as an external apparatus of the present invention so that a predetermined file name may be given beforehand to this terminal so as to automatically print one or a plurality of picture files 20*c* described in an index file 20*d* having the predetermined file name.

The following will describe a specific example of automatically specifying an index file to be printed, with reference to the drawings.

Figure 10:
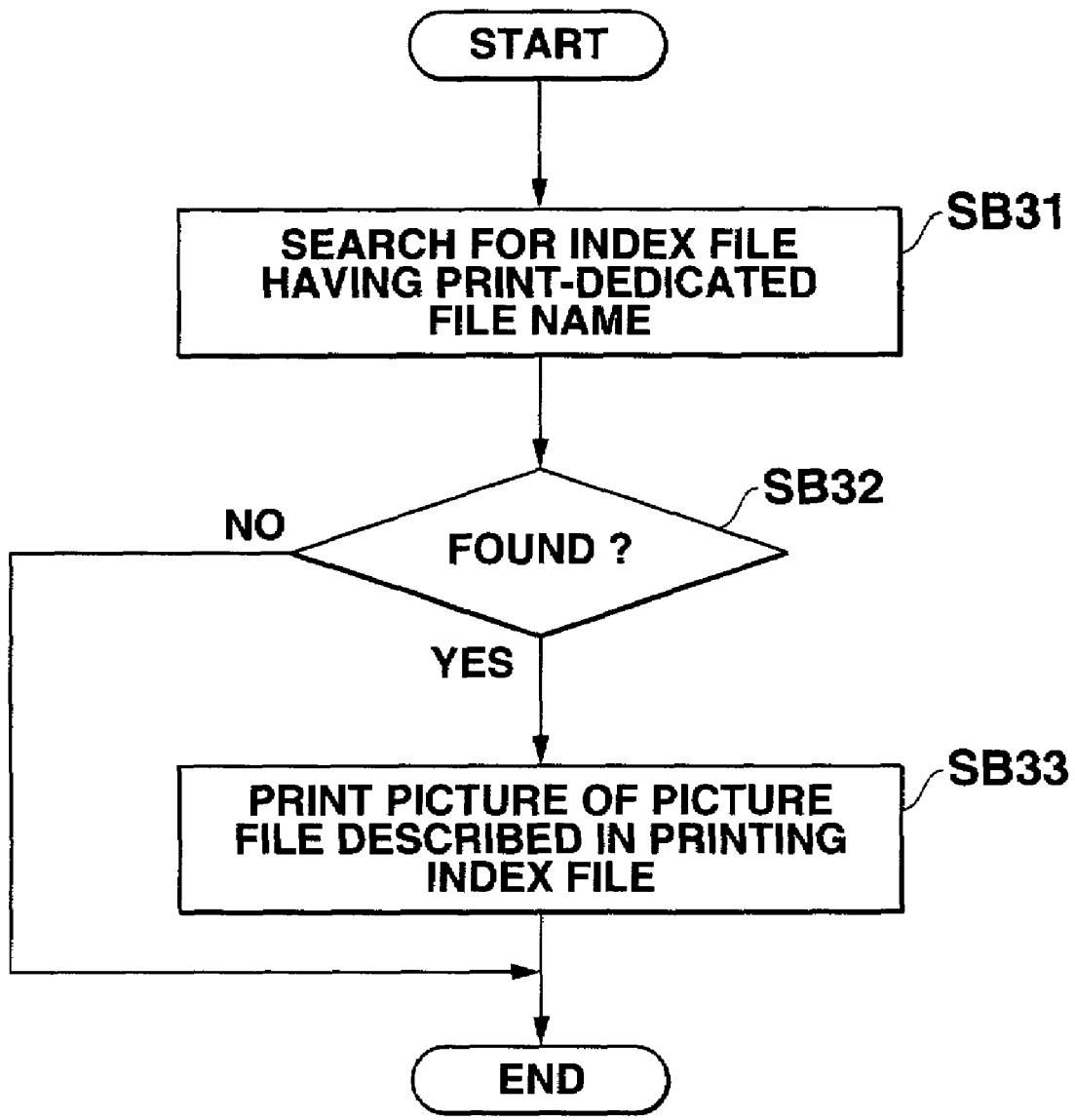
FIG. 10 is a flowchart for showing a still further operation of picture processing by the personal computer of the first embodiment.

FIG. 10 is a flowchart for explaining a variant of the flowchart of FIG. 7.

Upon activation of the picture processing program, the print-dedicated terminal searches the external flash memory 20 for those index files 20d assigned a printing file name of all the index files 20d following any dated folders 20b (step SB31). If any one of such index files 20d is found (YES is answered at step SB32), the print-dedicated terminal reads out from the external flash memory 20 a picture file (picture files) identified by a picture file name contained in that printing index file 20d and prints the read out picture file using the printer 42, thereby ending the process (step 3B33).

Although the flowchart of FIG. 10 has been described with a case where the present invention is applied to a print-dedicated terminal, the present invention is not limited thereto. For example, the present invention may be likewise applied to a display-dedicated terminal or a copy-dedicated terminal.

Furthermore, although FIG. 10 has been described with a case where the present invention is applied to a print-dedicated terminal, the present invention is not limited thereto. For example, the present invention may be applied to an external apparatus (personal computer 30 of FIG. 5) that can conduct all of the copy, print, and display processing items described along the flowcharts of FIGS. 8 and 9.

That is, when any one of the copy, print, and display processing items is specified (selected) and set and registered beforehand, processing as shown in FIG. 10 with respect to the print processing is conducted for the set and registered processing.

Second Embodiment

Figure 11:
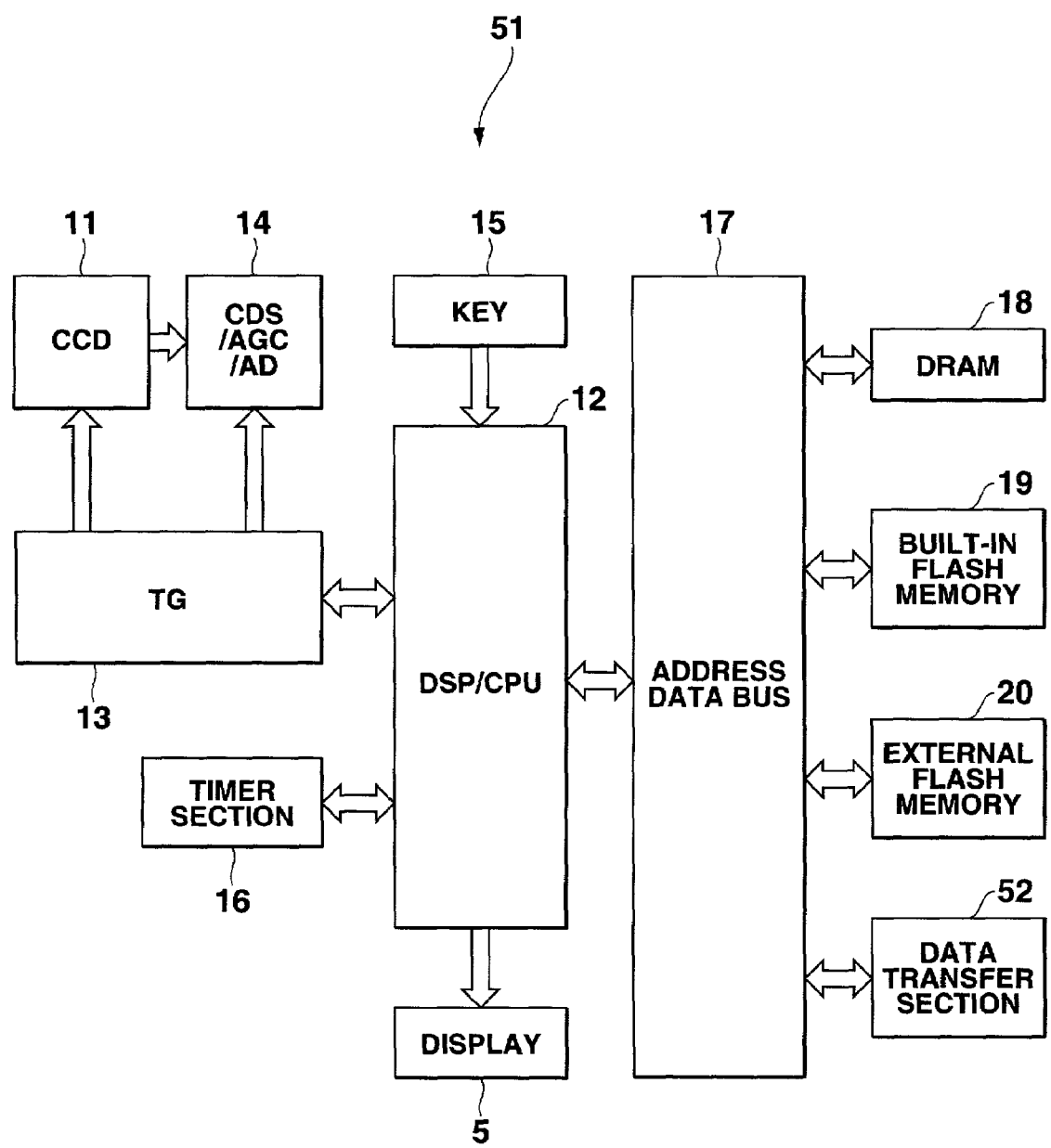
FIG. 11 is a block diagram for showing an outline of a digital camera related to a second embodiment of the present invention.

FIG. 11 is a block diagram for showing an electrical configuration of the digital camera 51 related to a second embodiment of the present invention. In addition to roughly the configuration as that of FIG. 2, the digital camera 51 has a data transfer section 52 connected to the address/data bus 17. The data transfer section 52 realizes an output section of the present invention and has an output terminal for attaching a communication cable (not shown), through which it is connected to an interface 36 of the personal computer 30 shown in FIG. 5. In this configuration, the picture files 20c and the index files 20d recorded in the external flash memory 20 are output to the personal computer etc. shown in FIG. 5. In this data transfer, signal processing is performed according to the predetermined standards of the RS232C, the USB, etc. The other sections of the digital camera 51 are the same as those of the digital camera 1 shown in FIG. 2 and so an explanation thereof is omitted.

With the digital camera 51 as described above, by grouping the pictures according to the flowchart of FIG. 6 corresponding to the user's operations in the reproduction mode, the above-mentioned index file 20d can be created and stored in the external flash memory 20. The digital camera 51 itself can also be connected to the personal computer 30 through the communication cable with predetermined data-transfer link software installed in the personal computer, to transfer the picture file 20c to the personal computer 30.

Figure 12:
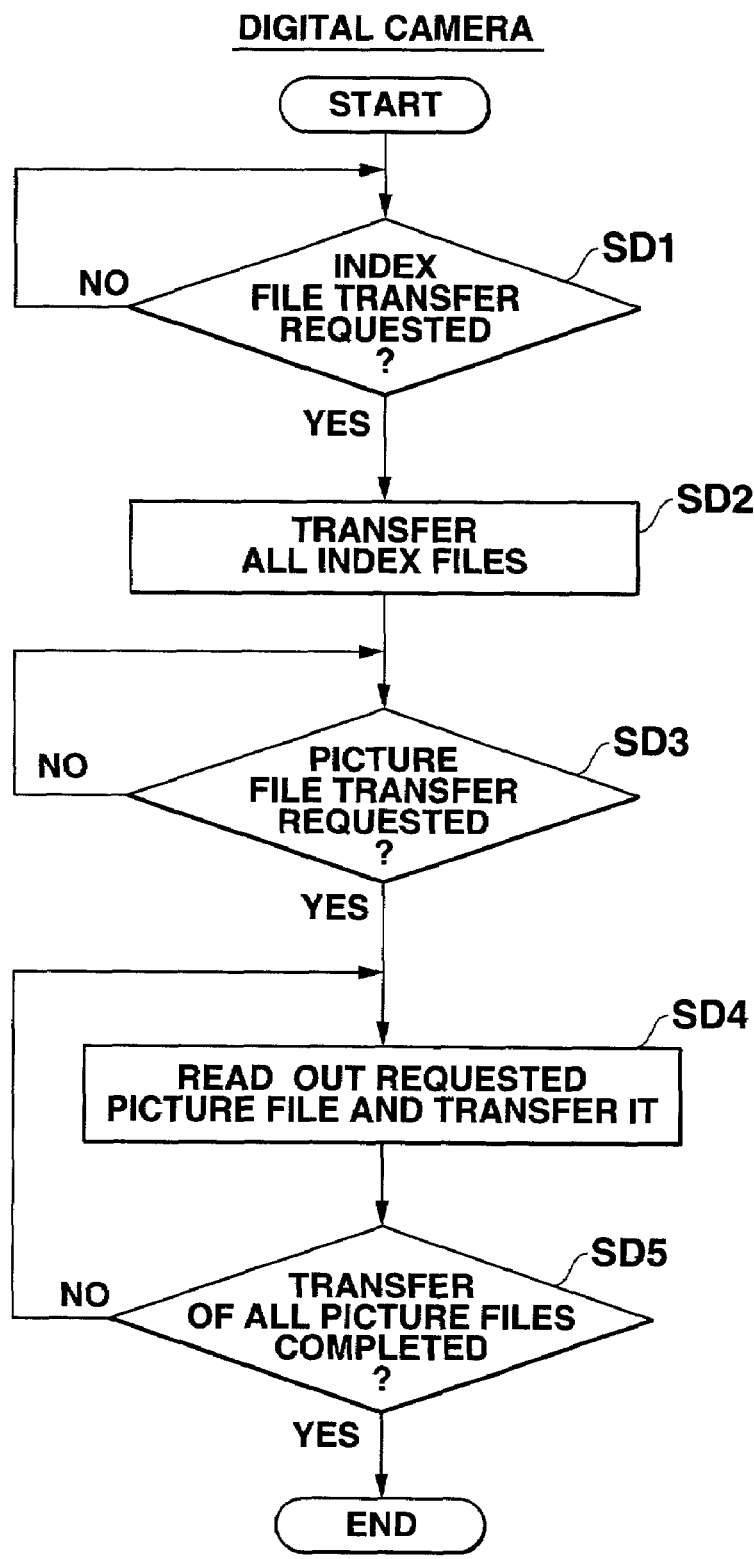
FIG. 12 is a flowchart for showing an operation of the side of the digital camera of the second embodiment.
Figure 13:
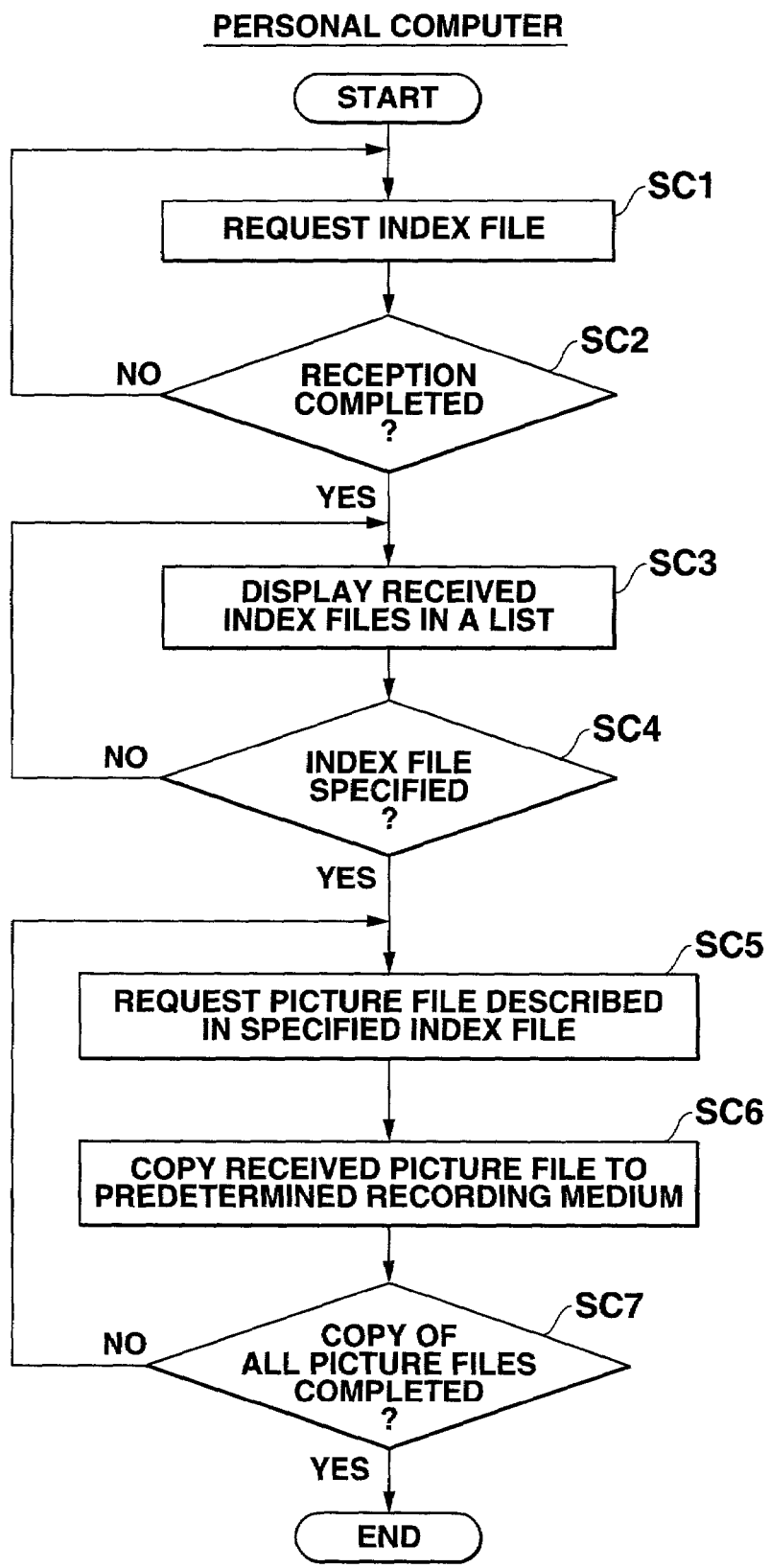
FIG. 13 is a flowchart for showing an operation of the side of a personal computer of the second embodiment.

FIGS. 12 and 13 are flowcharts for showing the operations of the digital camera 51 and the personal computer 30 respectively when the user transmits a predetermined picture file 20c recorded in the external flash memory 20 to the personal computer 30 with the digital camera 51 connected thereto via the communication cable.

That is, upon activation of the link software by the user, the personal computer 30 requests the digital camera 51 to send an index file thereto (step SC1). At this moment, the digital camera 51, after being connected with the communication cable, is waiting for a request for an index file, so that in response to a request from the personal computer (YES at step SD1), it reads out all the index files 20d recorded on the external flash memory 20 and transfers them to the personal computer 30 (step SD2).

Upon completion of reception of these index files 20d (YES at step SC2), the personal computer 30 in turn lists all the received index files 20d on the CRT 34 (step SC3) and waits for specification of one or more of the index files 20d (step SC4). If, subsequently, one or more of these listed index files 20d (e.g., "folderA.text") is specified (YES is answered at step SC4), the personal computer requests the digital camera 51 to send each of the picture files described in the specified index file 20d (step SC5). In this step, the personal computer 30 sends the information of a file name of the picture file 20c and also a dated folder 20b where the picture file 20c exists to the digital camera 51.

The digital camera 51 responds to a request from the personal computer 30 (YES at step SD3) by reading out the requested picture files sequentially and transferring them to the personal computer 30 (step SD4) and, upon completion of the transfer of all the picture files (YES at step SD5), ends the process. The personal computer 30 in turn sequentially receives the picture files 20c requested at the step SC5 and copies them to a predetermined recording medium (drive) (step SC6). When all the requested picture files are copied (YES is answered at step SC7), the process end directly.

As according to the first embodiment, according to the second embodiment, therefore, the user can specify a copy-subject picture in the digital camera 51 beforehand to thereby copy a picture file easily and efficiently. Almost the same effects other than this as those described with the first embodiment can be obtained.

According to the second embodiment, the purpose in use (usage) of a specified picture may be any other purpose, for example, printing, instead of copying. In such a case, desired pictures can be printed at a time immediately by operating a printer with which the digital camera 51 can be connected in much the same manner as mentioned above with respect to the personal computer 30. Moreover, it is possible to print only a desired picture without providing the printer with a display section required to confirm print-subject pictures. Further, by employing such a configuration that print-subject index files 20d are generated in the external flash memory 20 of the digital camera 51 while the printer is engaged in only the reading of those index files 20d, the printer need not specify any index file 20d, thus eliminating a need for the display section for specifying the index files 20d.

Although like the first embodiment, according to the second embodiment an index file 20d may be stored along with a picture file 20c into the external flash memory 20, the present invention is not limited thereto. For example, of course, these files 20c and 20d may be stored at different locations.

Besides the above-mentioned configurations, a password or an ID code may be recorded, in configuration, in one or all of the above-mentioned plurality of index files 20d for enabling the collation by the personal computer etc. when it engages in processing which corresponds to a predetermined use purpose of a picture file also only such processing that corresponds to a picture file 20c described in a collated index file 20d.

Furthermore, of course, the variations of the first embodiment (especially as shown in FIGS. 8–10) apply to the second embodiment as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera comprising:
an imaging section for imaging a subject and outputting a plurality of pieces of image data;
a specifying section for specifying a plurality of the image data pieces output from said imaging section;
an index file generating section for generating an index file containing a plurality of identifiers which respectively identify the image data pieces specified by said specifying section;
a first control section for storing in an image storage section the plurality of image data pieces output from the imaging section, and for storing in an index file storage section the index file generated by the index file generating section;
a first transmitting section for transmitting the index file stored in the index file storage section to an external device;
a first receiving section for receiving a transfer request signal transmitted from the external device, said transfer request signal requesting transferring of a plurality of the image data pieces stored in the image storage section; and
a second transmitting section for successively transmitting the requested image data pieces to the external device, in response to the transfer request signal received by the first receiving section;
wherein the external device comprises:
a second receiving section for receiving the index file transmitted by the first transmitting section;
a third transmitting section for transmitting to the digital camera the transfer request signal, said plurality of requested image data pieces comprising the image data pieces identified by the plurality of identifiers contained in the index file received by the second receiving section; and
a third receiving section for successively receiving the plurality of image data pieces successively transmitted by the second transmitting section.

2. The digital camera according to claim 1, wherein said image storage section and said index file storage section are provided on a recording medium that is attachable to and detachable from a body of the digital camera and that is also utilizable by the external device.

3. The digital camera according to claim 1, wherein said specifying section specifies the plurality of pieces of image data from among the plurality of image data pieces stored in said image storage section.

4. The digital camera according to claim 1, further comprising a display section for displaying at least a plurality of the pieces of image data stored in said image storage section, and
wherein said specifying section specifies the plurality of pieces of image data from among the pieces of image data displayed on said display section.

5. The digital camera according to claim 1, wherein:
said specifying section further specifies a group type of the specified pieces of image data;
said index file generating section generates said index file as an index file specific to the group type specified by said specifying section;
said control section further stores in the index file storage section a plurality of kinds of index files generated by the index file generating section;
said first transmitting section transmits the plurality of kinds of index files stored in the index file storage section to the external device;
said second receiving section receives the plurality of kinds of index files transmitted by the first transmitting section;
said external device further comprises a selecting section for selecting at least one of the plurality of kinds of index files received by the second receiving section; and
said third transmitting section transmits to the digital camera the transfer request signal to request the image data pieces identified by the plurality of identifiers contained in the at least one of the plurality of kinds of index files selected by the selecting section.

6. The digital camera according to claim 5, wherein the plurality of kinds of index files correspond to respective different group types.

7. The digital camera according to claim 5, wherein:
said specifying section specifies a plurality of group types for the same specified pieces of image data; and
said plurality of kinds of index files contain the same identifiers.

8. The digital camera according to claim 1, wherein said index file contains a file name which specifies said file.

9. The digital camera according to claim 1, wherein:
said first control section stores said image data in said image storage section in a format of an image file in which an image file name is added to said image data; and
said identifiers comprise image file names of the pieces of image data specified by said specifying section.

10. The digital camera according to claim 1, wherein said index file is of a text format.

11. The digital camera according to claim 1, further comprising:
a determining section for determining, each time one of the plurality of image data pieces is specified, whether or not the index file corresponding to the specified one of the image data pieces is stored in the index file storage section;
a second control section for, when the index file is determined to be stored in the index file storage section, adding the identifier corresponding to said one of the image data pieces to the stored index file; and
a third control section for, when the index file is determined not to be stored in the index file storage section, causing the index file generating section to generate the index file containing the identifier corresponding to said one of the image data pieces, and for then storing the generated index file in the index file storage section.

12. The digital camera according to claim 11, wherein:
said specifying section specifies a desired kind of the specified image data pieces;
said index file generating section generates the index file as an index file of the kind specified by the specifying section;
said determining section determines, each time said one of the plurality of image data pieces is specified, whether or not the index file of the same kind as said one of the image data pieces is stored in the index file storage section;
said second control section, when the index file of said same kind is determined to be stored in the index file storage section, adds the identifier corresponding to said one of the image data pieces to the stored index file; and said third control section, when the index file of said same kind is determined not to be stored in the index file storage section, causes the index file generating section to generate the index file of said same kind containing the identifier corresponding to said one of the image data pieces, and for then storing the generated index file in the index file storage section.

13. The digital camera according to claim 1, wherein:

said index file generating section generates a plurality of index files;

said first control section stores the plurality of index files in the index file storage section;

said first transmitting section transmits the plurality of index files stored in the index file storage section;

said second receiving section receives the plurality of index files transmitted from the first transmitting section;

said external device further comprises a selecting section for selecting at least one of the plurality of index files received by the second receiving section; and said third transmitting section transmits the transfer request signal for requesting transferring of the image data pieces identified by the identifiers contained in the at least one of the plurality of index files that is selected by the selecting section.

14. The digital camera according to claim 13, wherein the external device further comprises a display section for displaying in list form the plurality of index files received by the second receiving section, and the selecting section selects at least one of the displayed plurality of index files.

15. The digital camera according to claim 1, wherein the external device further comprises:

a selecting section for selecting a desired kind of image processing from a plurality of kinds of image processing with a manual operation; and a second control section for executing the kind of image processing selected by the selecting section on the plurality of image data pieces successively received by the third receiving section.

16. The digital camera according to claim 1, wherein:

said specifying section specifies a kind of the specified image data pieces;

said index file generating section generates the index file as an index file of the kind specified by the specifying section;

said first control section further stores in the index file storage section a plurality of kinds of index files generated by the index file generating section;

said first transmitting section transmits the plurality of kinds of index files stored in the index file storage section to the external device;

said second receiving section receives the plurality of kinds of index files transmitted by the first transmitting section;

said external device further comprises a retrieving section for retrieving a predetermined kind of index file from the plurality of kinds of index files received by the second receiving section, and a determining section for determining whether or not the predetermined kind of index file is retrieved; and said third transmitting section transmits to the digital camera the transfer request signal for requesting transferring of image data pieces identified by the plurality of identifiers contained in the retrieved predetermined kind of index file, when the determining section determines that the predetermined kind of index file is retrieved.

17. A digital camera comprising:

imaging means for imaging a subject and outputting a plurality of pieces of image data;

specifying means for specifying a plurality of the image data pieces output from the imaging means;

index file generating means for generating an index file containing a plurality of identifiers which respectively identify the image data pieces specified by said specifying means;

control means for storing in an image storage section the plurality of image data pieces output from said imaging means and also storing in an index file storage section the index file generated by said index file generating means;

first transmitting means for transmitting the index file stored in the index file storage section to an external device;

first receiving means for receiving a transfer request signal transmitted from the external device, said transfer request signal requesting transferring of a plurality of the image data pieces stored in the image storage section; and second transmitting means for successively transmitting the requested image data pieces to the external device, in response to the transfer request signal received by the first receiving means;

wherein the external device comprises:

second receiving means for receiving the index file transmitted by the first transmitting means;

third transmitting means for transmitting to the digital camera the transfer request signal, said plurality of requested image data pieces comprising the image data pieces identified by the plurality of identifiers contained in the index file received by the second receiving means; and third receiving means for successively receiving the plurality of image data pieces successively transmitted by the second transmitting means.

18. An image data managing apparatus comprising:

an image storage section for storing a plurality of pieces of image data;

a specifying section for specifying a plurality of the pieces of image data stored in said image storage section;

an index file generating section for generating an index file containing a plurality of identifiers which respectively identify the image data pieces specified by said specifying section;

an index file storage section for storing the index file generated by said index file generating section;

a first transmitting section for transmitting the index file stored in the index file storage section to an external device;

a first receiving section for receiving a transfer request signal transmitted from the external device, said transfer request signal requesting transferring of a plurality of the image data pieces stored in the image storage section; and a second transmitting section for successively transmitting the requested image data pieces to the external device, in response to the transfer request signal received by the first receiving section;

wherein the external device comprises:

a second receiving section for receiving the index file transmitted by the first transmitting section;

a third transmitting section for transmitting to the image data managing apparatus the transfer request signal, said plurality of requested image data pieces comprising the image data pieces identified by the plurality of identifiers contained in the index file received by the second receiving section; and a third receiving section for successively receiving the plurality of image data pieces successively transmitted by the second transmitting section.

19. A computer-readable recording medium recording an image data managing program that is executable by a computer of a digital camera, wherein the digital camera comprises an imaging section for imaging a subject and outputting image data thereof, and a storage section for storing a plurality of pieces of image data output from the imaging section, said image data managing program being executable by the computer to cause the computer to execute:

specifying a plurality of the pieces of image data stored in the storage section;

generating an index file containing a plurality of identifiers which respectively identify the plurality of specified pieces of image data;

storing the generated index file in the storage section;

transmitting the index file stored in the storage section to an external device;

receiving a transfer request signal transmitted from the external device, said transfer request signal requesting transferring of a plurality of the pieces of image data stored in the storage section; and successively transmitting the requested pieces of image data to the external device, in response to the received transfer request signal;

wherein the external device comprises:
  a first receiving section for receiving the transmitted index file;
  a transmitting section for transmitting to the digital camera the transfer request signal, said plurality of requested pieces of image data comprising the pieces of image data identified by the plurality of identifiers contained in the index file received by the first receiving section; and
  a second receiving section for successively receiving the plurality of pieces of image data successively transmitted from the digital camera.

20. An image data managing method for a digital camera, wherein the digital camera comprises an imaging section for imaging a subject and outputting image data thereof, and a storage section for storing a plurality of pieces of image data output from the imaging section, said method comprising:

specifying a plurality of the image data pieces stored in the storage section;

generating an index file containing a plurality of identifiers which respectively identify the plurality of specified image data pieces;

storing the generated index file in the storage section;

transmitting the index file stored in the storage section to an external device;

receiving a transfer request signal transmitted from the external device, said transfer request signal requesting transferring of a plurality of the pieces of image data stored in the storage section; and successively transmitting the requested pieces of image data to the external device, in response to the received transfer request signal;

wherein the external device comprises:
  a first receiving section for receiving the transmitted index file;
  a transmitting section for transmitting to the digital camera the transfer request signal, said plurality of requested pieces of image data comprising the pieces of image data identified by the plurality of identifiers contained in the index file received by the first receiving section; and
  a second receiving section for successively receiving the plurality of pieces of image data successively transmitted from the digital camera.

21. An image data managing apparatus comprising:

an acquiring section for acquiring index files which are stored in an index file storage section, and which contain identifiers with which image data pieces can be identified, respectively;

a determining section for determining whether or not any one of the index files acquired by said acquiring section is specified by a manual operation;

a control section for executing image processing on any one of image data pieces stored in an image storage section that is identified by the identifier contained in said any one of the index files acquired by said acquiring section, which is specified by the manual operation when said determining section determines that said any one of the index files is specified;

wherein:

said acquiring section includes a first receiving section for receiving index files output from a digital camera;

said determining section determines whether or not any one of the index files received by said first receiving section is specified by a manual operation;

said control section comprises (i) an output section for outputting to the digital camera a transfer request signal for requesting transferring of said any one of the image data pieces that is identified by the identifier contained in said any one of the index files which is specified by the manual operation, when said determining section determines that said any one of the index files is specified by the manual operation, and (ii) a second receiving section for receiving from the digital camera said any one of the image data pieces which is requested to be transferred by the transfer request signal output from said output section; and said control section executes the image processing on said any one of the image data pieces which is received by said second receiving section.

22. The image data managing apparatus according to claim 21, wherein said index file storage section and said image storage section are provided on a recording medium which can be attached to and detached from a body of the digital camera.

23. The image data managing apparatus according to claim 21, further comprising a display section for displaying the index files acquired by said acquiring section, and said specifying section specifying at least one of a plurality of index files displayed on said display section.

24. The image data managing apparatus according to claim 21, further comprising a selecting section for selecting any given image processing item of a plurality of types of image processing items, said selecting section being manually operated, said control section executing an image processing item selected by said selecting section on image data identified by the identifier contained in said any one of the index files which is specified by the manual operation.

25. The image data managing apparatus according to claim 21, wherein:
said acquiring section can acquire a plurality of types of index files; and
said control section executes image processing determined on the basis of a type of said any one of the index files which is specified by the manual operation, on image data identified by the identifier contained in said any one of the index files which is specified by the manual operation.

26. The image data managing apparatus according to claim 21, wherein said control section executes copy, display, or print processing on said image data.

27. An image data managing apparatus comprising:
acquiring means for acquiring index files which are stored in an index file storage section and which contain identifiers with which image data pieces can be identified, respectively;
determining means for determining whether or not any one of the index files acquired by said acquiring means is specified by a manual operation; and
control means for executing image processing on any one of image data pieces stored in an image storage section that is identified by the identifier contained in said any one of the index files which is specified by the manual operation when said determining means determines that said any one of the index files is specified by the manual operation;
wherein:
said acquiring means includes first receiving means for receiving index files output from a digital camera;
said determining means determines whether or not any one of the index files received by said first receiving means is specified by a manual operation;
said control means comprises (i) output means for outputting to the digital camera a transfer request signal for requesting transferring of said any one of the image data pieces that is identified by the identifier contained in said any one of the index files which is specified by the manual operation, when said determining means determines that said any one of the index files is specified by the manual operation, and (ii) second receiving means for receiving from the digital camera said any one of the image data pieces which is requested to be transferred by the transfer request signal output from said output means; and
said control means executes the image processing on said any one of the image data pieces which is received by said second receiving means.

28. A computer-readable recording medium recording an image data managing program that is executable by a computer of an image data managing apparatus for processing image data to cause the computer to execute:
receiving index files that are output from a digital camera and that contain identifiers which can specify image data;
determining whether or not any one of the received index files is specified by a manual operation;
outputting to the digital camera a transfer request signal for requesting transferring of image data that is identified by the at least one identifier contained in said any one of the index files which is specified by the manual operation, when it is determined that said any one of the index files is specified by the manual operation;
receiving image data which is output from the digital camera in response to the output transfer request signal; and
executing image processing on the received image data.

29. An image data managing method comprising:
receiving index files that are output from a digital camera and that contain identifiers which can specify image data;
determining whether or not any one of the received index files is specified by a manual operation;
outputting to the digital camera a transfer request signal for requesting transferring of image data that is identified by the at least one identifier contained in said any one of the index files which is specified by the manual operation;
receiving image data which is output from the digital camera in response to the output transfer request signal; and
executing image processing on the received image data.

30. An image data managing apparatus comprising:
an acquiring section for acquiring an index file which is stored in an index file storage section, and which contains an identifier with which an image data piece can be identified among image data pieces stored in an image storage section;
a determining section for determining whether or not a desired kind of image processing for the index file stored in the index file storage section is selected by a manual operation from a plurality of kinds of image processing;
a control section for executing the kind of image processing selected by the manual operation on the image data piece that is identified by the identifier contained in the index file acquired by said acquiring section, when said determining section determines that the desired kind of the image processing for the stored index file is selected;
wherein:
said acquiring section includes a first receiving section for receiving an index file output from the digital camera;
said control section comprises (i) an output section for outputting to the digital camera a transfer request signal for requesting transferring of an image data piece identified by an identifier contained in the index file received by said first receiving section, and (ii) a second receiving section for receiving from the digital camera the image data piece requested to be transferred by the transfer request signal output from said output section; and
said control section executes the selected kind of image processing on the image data piece received by said second receiving section.

31. The image data managing apparatus according to claim 30, further comprising a display section for displaying contents of the plurality of kinds of image processing, and wherein said determining section determines whether or not any one of the contents of the plurality of kinds of image processing is selected by a manual operation.

32. The image data managing apparatus according to claim 30, wherein said index file storage section and said image storage section are formed on a recording medium removably provided in a main body of the digital camera.

33. The image data managing apparatus according to claim 30, wherein the kinds of image processing comprise copy processing, display processing and print processing.

34. An image data managing apparatus comprising:
an acquiring section for acquiring a plurality of kinds of index files which are stored in an index file storage section, and which contain identifiers with which image data pieces can be identified, respectively;

a retrieving section for retrieving a predetermined kind of index file from the plurality of kinds of index files acquired by said acquiring section;

a determining section for determining whether or not the predetermined kind of index file is retrieved by said retrieving section; and a control section for executing a predetermined kind of image processing on an image data piece included in image data pieces stored in an image storage section that is identified by the identifier contained in the index file retrieved by said retrieving section, when said determining section determines that the predetermined kind of index file is retrieved;

wherein:

said acquiring section includes a first receiving section for receiving a plurality of kinds of index files output from the digital camera;

said control section includes (i) an output section for outputting to the digital camera a transfer request signal for requesting transferring of the image data piece identified by the identifier contained in the predetermined kind of index file retrieved by the retrieving section, when said determining section determines that the predetermined kind of index file is retrieved, and (ii) a second receiving section for receiving from the digital camera the image data piece requested to be transferred by the transfer request signal output from said output section; and said control section executes the predetermined kind of image processing on the image data piece received by said second receiving section.

35. The image data managing apparatus according to claim 34, further comprising a setting and registering section for selecting one of the plurality of kinds of image processing, and setting and registering said one of the plurality of kinds of image processing, and wherein said retrieving section retrieves a predetermined kind of index file set and registered by said setting and registering section, from the plurality of kinds of index files acquired by said acquiring section.

36. The image data managing apparatus according to claim 34, wherein said index file storage section and said image storage section are formed on a recording medium removably provided in a main body of the digital camera.

37. The image data managing apparatus according to claim 34, wherein the predetermined kind of image processing is copy processing, display processing or print processing.

38. An image data managing apparatus comprising:

a first receiving section for receiving index files which are sent from a digital camera, and each of which contains a plurality of identifiers with which image data pieces can be identified, respectively;

a specifying section for specifying at least one of the index files received by said first receiving section;

a sending section for sending to the digital camera a transfer request signal for requesting transferring of the image data pieces which are identified by the identifiers contained in said at least one of the index files which is specified by said specifying section; and a second receiving section for successively receiving from the digital camera the image data pieces requested to be transferred by the transfer request signal sent from said sending section to the digital camera.

39. The image data managing apparatus according to claim 38, which further comprises a control section for executing a predetermined image processing on the plurality of image data pieces successively received by said second receiving section.

40. The image data managing apparatus according to claim 38, wherein each said index file has a text format.

41. The image data managing apparatus according to claim 38, further comprising a requesting section for making a request for requesting the digital camera to send the index file, and wherein said first receiving section receives the index file which is sent from the digital camera in response to the request made by said requesting section.

42. An image data managing system comprising a digital camera and an image data managing apparatus, wherein said digital camera comprises (i) an imaging section for imaging a subject, and outputting a plurality of image data pieces, (ii) a specifying section for specifying at least one of the plurality of image data pieces output from said imaging section, (iii) an index file generating section for generating an index file containing a plurality of identifiers with which the image data pieces can be identified, respectively, (iv) a control section for storing the plurality of image data pieces output from said imaging section, and storing in an index file storage section the index file generated by said index file generating section, and (v) a first sending section for sending the index file stored in the index file storage section to the image data managing apparatus, wherein the image data managing apparatus comprises (i) a first receiving section for receiving the index file sent from said first sending section, and (ii) a second sending section for sending to the digital camera a transfer request signal for requesting transferring of the image data pieces specified with the identifiers contained in the index file received by said first receiving section, wherein the digital camera further comprises (vi) a second receiving section for receiving the transfer request signal sent from said second sending section, and (vii) a third sending section for successively sending to the image data managing apparatus the plurality of image data pieces which are stored in the image storage section, and which are identified by the transfer request signal received by said second receiving section, respectively, and wherein the image data managing apparatus further comprises a third receiving section for successively receiving the plurality of image data pieces successively sent from said third sending section.

43. The image data managing apparatus according to claim 42, wherein:

the image data managing apparatus further comprises a requesting section for making a request for requesting the digital camera to send the index file;

the digital camera includes a determining section for determining whether or not the request is made by the requesting section; and the first sending section sends the index file stored in the index file storage section to the image data managing apparatus, when said determining section determines that the request is made by the requesting section.

44. An image data managing apparatus comprising:

acquiring means for acquiring an index file which is stored in an index file storage section, and which contains an identifier with which an image data piece can be identified among image data pieces stored in an image storage section;

determining means for determining whether or not a desired kind of image processing for the index file stored in the index file storage section is selected from a plurality of kinds of image processing by a manual operation;

control means for executing the kind of image processing selected by the manual operation on the image data piece that is identified by the identifier contained in the index file acquired by said acquiring means, when said determining means determines that the desired kind of the image processing for the stored index file is selected;

wherein:

said acquiring means includes first receiving means for receiving an index file output from the digital camera;

said control means comprises (i) output means for outputting to the digital camera a transfer request signal for requesting transferring of an image data piece identified by an identifier contained in the index file received by said first receiving means, and (ii) second receiving means for receiving from the digital camera the image data piece requested to be transferred by the transfer request signal output from said output means; and said control means executes the image processing the kind of which is selected by the manual operation, on the image data piece received by said second receiving means.

45. A computer-readable recording medium recording an image data managing program that is executable by a computer of an image data managing apparatus for processing image data to cause the computer to execute:

receiving an index file which is output from a digital camera, and which contains an identifier with which an image data piece can be identified;

outputting to the digital camera a transfer request signal for requesting transferring of the image data piece specified with the identifier contained in the received index file;

receiving from the digital camera the image data piece requested to be transferred by the transfer request signal;

determining whether or not a desired kind of image processing is selected from a plurality of kinds of image processing by a manual operation; and executing the selected kind of image processing on the received image data piece, when it is determined that the desired kind of the image processing is selected.

46. An image data managing method comprising the steps of:

receiving an index file which is output from a digital camera, and which contains an identifier with which an image data piece can be identified;

outputting to the digital camera a transfer request signal for requesting transferring of the image data piece specified with the identifier contained in the received index file;

receiving from the digital camera the image data piece requested to be transferred by the transfer request signal;

determining whether or not a desired kind of image processing is selected from a plurality of kinds of image processing by a manual operation; and executing the selected image processing on the received image data piece when it is determined that the desired kind of the image processing is selected.

47. An image data managing apparatus comprising:

acquiring means for acquiring a plurality of kinds of index files which are stored in an index file storage section, and which contain identifiers with which image data pieces can be identified, respectively;

retrieving means for retrieving a predetermined kind of index file from the plurality of kinds of index files acquired by said acquiring means;

determining means for determining whether or not the predetermined kind of index file is retrieved by said retrieving means; and control means for executing a predetermined kind of image processing on an image data piece included in image data pieces stored in an image storage section that is identified by the identifier contained in the index file retrieved by said retrieving means, when said determining means determines that the predetermined kind of index file is retrieved;

wherein:

said acquiring means includes first receiving means for receiving a plurality of kinds of index files output from the digital camera;

said control means includes (i) output means for outputting to the digital camera a transfer request signal for requesting transferring of an image data piece identified by the identifier contained in the predetermined kind of index file retrieved by the retrieving means, when said determining means determines that the predetermined kind of index file is retrieved, and (ii) second receiving means for receiving from the digital camera the image data piece requested to be transferred by the transfer request signal output from said output means; and said control means executes the predetermined kind of image processing on the image data piece received by said second receiving means.

48. A computer-readable recording medium recording an image data managing program that is executable by a computer of an image data managing apparatus for processing image data to cause the computer to execute:

receiving a plurality of kinds of index files which are output from a digital camera, and which contain identifiers with which image data pieces can be identified, respectively;

retrieving a predetermined kind of index file from the acquired plurality of kinds of index files;

determining whether or not the predetermined kind of index file is retrieved;

outputting to the digital camera a transfer request signal for requesting transferring of the image data piece identified by the identifier contained in the retrieved index file, when it is determined that the predetermined kind of index file is retrieved;

receiving from the digital camera the image data piece requested to be transferred by the output transfer request signal; and executing a predetermined kind of image processing on the received image data piece.

49. An image data managing method comprising:

receiving a plurality of kinds of index files which are output from a digital camera, and which contain identifiers with which image data pieces can be identified, respectively;

retrieving a predetermined kind of index file from the acquired plurality of kinds of index files;

determining whether or not the predetermined kind of index file is retrieved;

outputting to the digital camera a transfer request signal for requesting transferring of the image data piece identified by the identifier contained in the retrieved index file, when it is determined that the predetermined kind of index file is retrieved;

receiving from the digital camera the image data piece requested to be transferred by the output transfer request signal; and executing the predetermined kind of image processing on the received image data piece.

50. An image data managing apparatus comprising:

first receiving means for receiving index files which are sent from a digital camera, each of which contains a plurality of identifiers with which image data pieces can be identified, respectively;

specifying means for specifying at least one of the index files received by the first receiving means;

sending means for sending to the digital camera a transfer request signal for requesting transferring of the image data pieces identified by the plurality of identifiers which are contained in said at least one of the index files which is specified by said specifying means; and second receiving means for successively receiving from the digital camera the image data pieces requested to be transferred by the transfer request signal sent from said sending means to the digital camera.

51. A computer-readable recording medium recording an image data managing program that is executable by a computer of an image data managing apparatus for processing image data to cause the computer to execute:

receiving index files which are sent from a digital camera, and each of which contains a plurality of identifiers with which image data pieces can be identified, respectively;

specifying at least one of the received index files;

sending to the digital camera a transfer request signal for requesting transferring of the image data pieces identified by the plurality of identifiers which are contained in said at least one of the index files which is specified; and successively receiving from the digital camera the image data pieces requested to be transferred by the transfer request signal sent to the digital camera.

52. An image data managing method comprising the steps of:

receiving index files which are sent from a digital camera, and each of which contains a plurality of identifiers with which image data pieces can be identified, respectively;

specifying at least one of the received index files;

sending to the digital camera a transfer request signal for requesting transferring of the image data pieces identified by the plurality of identifiers which are contained in said at least one of the index files which is specified; and successively receiving from the digital camera the image data pieces requested to be transferred by the transfer request signal sent to the digital camera.

53. An image data managing apparatus comprising:

an acquiring section for acquiring a plurality of kinds of index files which are stored in an index file storage section, and each of which contains at least one identifier which identifies a corresponding at least one piece of image data that is among a plurality of pieces of image data stored in an image storage section;

a selecting section for selecting a kind of image processing from a plurality of kinds of image processing;

a retrieving section for retrieving one of the acquired index files that is of a same kind as the selected kind of image processing;

a determining section for determining whether or not the index file of said same kind has been retrieved by the retrieving section; and a control section for executing the selected kind of image processing on the at least one image data piece that is identified by the at least one identifier contained in the index file retrieved by the retrieving section, when the determining section determines that the index file of said same kind has been retrieved;

wherein:

said acquiring section includes a first receiving section for receiving the plurality of kinds of index files from a digital camera;

said control section comprises: (i) an output section for outputting to the digital camera the identifier contained in the retrieved index file, when the determining section determines that the index file of said same kind has been retrieved, and (ii) a second receiving section for receiving from the digital camera the at least one image data piece corresponding to the identifier output from the output section; and said control section executes the predetermined kind of image processing on the at least one image data piece received by the second receiving section.

54. The image data managing apparatus according to claim 53, wherein the index file storage section and the image storage section are formed on a recording medium removably provided in a main body of the digital camera.

55. The image data managing apparatus according to claim 53, wherein the plurality of kinds of image processing comprise copy processing, display processing and print processing.

56. An image data managing apparatus comprising:

a first receiving section for receiving an index file which is transmitted from a digital camera, and which contains identifiers which respectively identify image data pieces;

a first transmitting section for transmitting to the digital camera a transfer request signal for requesting transferring of the image data pieces identified by the identifiers contained in the index file received by the first receiving section; and a second receiving section for successively receiving from the digital camera the image data pieces requested to be transferred by the transfer request signal;

wherein the digital camera comprises:

an imaging section for imaging a subject and outputting a plurality of pieces of image data;

a specifying section for specifying a plurality of the image data pieces output from the imaging section;

an index file generating section for generating an index file containing the plurality of identifiers, which respectively identify the image data pieces specified by the specifying section;

a first control section for storing in an image storage section the image data pieces output from the imaging section, and for storing in an index file storage section the index file generated by the index file generating section;

a second transmitting section for transmitting the index file stored in the index file storage section;

a third receiving section for receiving the transfer request signal transmitted by the first transmitting section; and a third transmitting section for successively transmitting, to the second receiving section, the requested image data pieces stored in the image storage section.

57. The image data managing apparatus according to claim 56, wherein the index file storage section and the image storage section are formed on a recording medium removably provided in a main body of the digital camera.

58. The image data managing apparatus according to claim 56, further comprising a second control section for executing image processing on the plurality of image data pieces received by the second receiving section.

59. The image data managing apparatus according to claim 58, wherein the image processing executed by the second control section comprises at least one of copy processing, display processing and print processing.

60. An image data managing apparatus comprising:
first receiving means for receiving an index file which is transmitted from a digital camera, and which contains identifiers which respectively identify image data pieces;
first transmitting means for transmitting to the digital camera a transfer request signal for requesting transferring of the image data pieces identified by the identifiers contained in the index file received by the first receiving means; and
second receiving means for successively receiving from the digital camera the image data pieces requested to be transferred by the transfer request signal;
wherein the digital camera comprises:
imaging means for imaging a subject and outputting a plurality of pieces of image data;
specifying means for specifying a plurality of the image data pieces output from the imaging means;
index file generating means for generating an index file containing the plurality of identifiers, which respectively identify the image data pieces specified by the specifying means;
control means for storing in an image storage section the image data pieces output from the imaging section, and for storing in an index file storage section the index file generated by the index file generating means;
second transmitting means for transmitting the index file stored in the index file storage means;
third receiving means for receiving the transfer request signal transmitted by the first transmitting means; and
third transmitting means for successively transmitting, to the second receiving means, the requested image data pieces stored in the image storage section.

61. A computer-readable recording medium recording an image data managing program that is executable by a computer of an image data managing apparatus for processing image data to cause the computer to execute:
receiving an index file which is transmitted from a digital camera, and which contains identifiers which respectively identify image data pieces;
transmitting to the digital camera a transfer request signal for requesting transferring of the image data pieces identified by the identifiers contained in the received index file; and
successively receiving from the digital camera the image data pieces requested to be transferred by the transfer request signal;
wherein the digital camera comprises:
an imaging section for imaging a subject and outputting a plurality of pieces of image data;
a specifying section for specifying a plurality of the image data pieces output from the imaging section;
an index file generating section for generating an index file containing the plurality of identifiers, which respectively identify the image data pieces specified by the specifying section;
a control section for storing in an image storage section the image data pieces output from the imaging section, and for storing in an index file storage section the index file generated by the index file generating section;
a first transmitting section for transmitting the index file stored in the index file storage section;
a receiving section for receiving the transfer request signal; and
a second transmitting section for successively transmitting, to the image data management apparatus, the requested image data pieces stored in the image storage section.

62. An image data managing method comprising:
receiving an index file which is transmitted from a digital camera, and which contains identifiers which respectively identify image data pieces;
transmitting to the digital camera a transfer request signal for requesting transferring of the image data pieces identified by the identifiers contained in the received index file; and
successively receiving from the digital camera the image data pieces requested to be transferred by the transfer request signal;
wherein the digital camera comprises:
an imaging section for imaging a subject and outputting a plurality of pieces of image data;
a specifying section for specifying a plurality of the image data pieces output from the imaging section;
an index file generating section for generating an index file containing the plurality of identifiers, which respectively identify the image data pieces specified by the specifying section;
a control section for storing in an image storage section the image data pieces output from the imaging section, and for storing in an index file storage section the index file generated by the index file generating section;
a first transmitting section for transmitting the index file stored in the index file storage section;
a receiving section for receiving the transfer request signal; and
a second transmitting section for successively transmitting the requested image data pieces stored in the image storage section.

* * * * *